(12) United States Patent
Haga

(10) Patent No.: US 10,769,777 B2
(45) Date of Patent: Sep. 8, 2020

(54) INSPECTION DEVICE AND INSPECTION METHOD

(71) Applicant: FUJITSU LIMITED, Kawasaki-shi, Kanagawa (JP)

(72) Inventor: Susumu Haga, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 16/042,183

(22) Filed: Jul. 23, 2018

(65) Prior Publication Data

US 2019/0043181 A1 Feb. 7, 2019

(30) Foreign Application Priority Data

Aug. 4, 2017 (JP) ................................. 2017-151894

(51) Int. Cl.
| | |
|---|---|
| G06T 7/00 | (2017.01) |
| G06T 5/20 | (2006.01) |
| G06F 9/48 | (2006.01) |
| G06K 9/66 | (2006.01) |
| G06K 9/62 | (2006.01) |

(52) U.S. Cl.
CPC ............... G06T 7/001 (2013.01); G06F 9/48 (2013.01); G06K 9/6227 (2013.01); G06K 9/66 (2013.01); G06T 5/20 (2013.01); G06T 2207/20081 (2013.01)

(58) Field of Classification Search
CPC .................. G06T 7/001; G01N 2021/8887
USPC ......... 348/65, 57, 156, 222.1, 125; 382/254, 382/103, 135, 159, 209, 228; 706/52
See application file for complete search history.

(56) References Cited

U.S. PATENT DOCUMENTS

| | | | | |
|---|---|---|---|---|
| 2007/0230814 | A1* | 10/2007 | Haseyama | ................ G06T 7/12 382/254 |
| 2007/0258640 | A1 | 11/2007 | Abe et al. | |
| 2014/0348420 | A1 | 11/2014 | Chattopadhyay et al. | |
| 2017/0330315 | A1* | 11/2017 | Okuda | ............... G01N 21/8851 |

FOREIGN PATENT DOCUMENTS

| | | |
|---|---|---|
| JP | 2007-200246 | 8/2007 |
| JP | 2007-293732 | 11/2007 |
| JP | 2007-327848 | 12/2007 |
| JP | 2016-184412 | 10/2016 |

* cited by examiner

*Primary Examiner* — Kiet M Doan
(74) *Attorney, Agent, or Firm* — Staas & Halsey LLP

(57) ABSTRACT

Inspection device including processor configured to execute process, the process including:
  making accept/reject testing on inspection image through first image inspection program in group of image inspection programs including plurality of learning-type image inspection programs of different generations, each of which satisfies predetermined standard of fitness of the image inspection program with respect to learning image; and
  replacing the first image inspection program with second image inspection program in the group of image inspection programs which exhibits optimum fitness with respect to the misrecognized inspection image, when operator makes the accept/reject testing on the inspection image that has undergone the accept/reject testing through the first image inspection program and finds the misrecognized inspection image.

6 Claims, 24 Drawing Sheets

FIG. 12

| TESTING DATE AND TIME | VARIETY INFORMATION (INSPECTION TARGET) | IMAGE ID | PROGRAM TESTING RESULT |
|---|---|---|---|
| 2017/07/03 13:05:10 | COMPONENT 1 | IMG 0001 | O K |
| 2017/07/03 13:05:20 | COMPONENT 1 | IMG 0002 | N G |
| 2017/07/03 13:05:30 | COMPONENT 1 | IMG 0003 | O K |
| ⋮ | ⋮ | ⋮ | ⋮ |
| 2017/07/03 13:0X:XX | COMPONENT 1 | IMG 0004 | O K |
| 2017/07/03 13:0X:XX | COMPONENT 1 | IMG 0005 | N G |
| ⋮ | ⋮ | ⋮ | ⋮ |

FIG. 14

| TESTING DATE AND TIME | VARIETY INFORMATION (INSPECTION TARGET) | IMAGE ID | PROGRAM TESTING RESULT |
|---|---|---|---|
| 2017/07/03 13:05:10 | COMPONENT 1 | IMG 0001 | OK |
| 2017/07/03 13:05:20 | COMPONENT 1 | IMG 0002 | NG |
| 2017/07/03 13:05:30 | COMPONENT 1 | IMG 0003 | OK |
| 2017/07/03 13:0X:XX | COMPONENT 1 | IMG 0004 | OK |
| 2017/07/03 13:0X:XX | COMPONENT 1 | IMG 0005 | NG |
| : | : | : | : |

| OPERATOR TESTING DATE AND TIME | VISUAL ACCEPT/REJECT TESTING RESULT | ACCEPT/REJECT TESTING FLAG | MISJUDGMENT FLAG | FALSE REPORT FLAG |
|---|---|---|---|---|
| 2017/07/05 10:05:10 | OK | 1 | 0 | 0 |
| 2017/07/05 10:06:20 | NG | 1 | 0 | 0 |
| 2017/07/05 10:07:30 | NG | 0 | 1 | 0 |
| : | : | : | : | : |
| 2017/07/05 10:0X:XX | OK | 1 | 0 | 0 |
| 2017/07/05 10:0X:XX | OK | 0 | 0 | 1 |
| : | : | : | : | : |

FIG. 15

| MISRECOGNIZED INSPECTION IMAGE | | IMAGE INSPECTION PROGRAM B | | | | IMAGE INSPECTION PROGRAM C | | | |
|---|---|---|---|---|---|---|---|---|---|
| IMAGE ID | | | | FALSE REPORT | MARGIN VALUE | | | FALSE REPORT | MARGIN VALUE |
| IMG 0003 | NG | NG | 1 | 0 | −1.2 | NG | 1 | 0 | −1.5 |
| IMG 0005 | OK | OK | 1 | 0 | 1.0 | OK | 1 | 0 | 0.9 |
| IMG 1011 | NG | NG | 1 | 0 | −1.5 | NG | 1 | 0 | −1.0 |
| IMG 1532 | OK | OK | 1 | 0 | 1.5 | OK | 1 | 0 | 0.6 |
| IMG 2005 | NG | NG | 1 | 0 | −0.9 | NG | 1 | 0 | −0.6 |
| IMG 2306 | OK | OK | 1 | 0 | 0.8 | OK | 1 | 0 | 1.0 |
| ... | ... | ... | ... | ... | ... | ... | ... | ... | ... |

| MISRECOGNIZED INSPECTION IMAGE | | IMAGE INSPECTION PROGRAM D | | | | IMAGE INSPECTION PROGRAM E | | | |
|---|---|---|---|---|---|---|---|---|---|
| IMAGE ID | | | | FALSE REPORT | MARGIN VALUE | | | FALSE REPORT | MARGIN VALUE |
| IMG 0003 | NG | NG | 1 | 0 | −0.7 | OK | 0 | 1 | 0.5 |
| IMG 0005 | OK | OK | 1 | 0 | 1.0 | OK | 1 | 0 | 1.2 |
| IMG 1011 | NG | NG | 1 | 0 | −0.4 | NG | 1 | 0 | −0.4 |
| IMG 1532 | OK | NG | 0 | 1 | −1.2 | NG | 0 | 1 | −1.1 |
| IMG 2005 | NG | NG | 1 | 0 | −0.6 | NG | 1 | 0 | −0.2 |
| IMG 2306 | OK | OK | 1 | 0 | 0.9 | OK | 1 | 0 | 0.7 |
| ... | ... | ... | ... | ... | ... | ... | ... | ... | ... |

INSPECTION DEVICE AND INSPECTION METHOD

CROSS-REFERENCE TO RELATED APPLICATIONS

This application is based upon and claims the benefit of priority of the prior Japanese Patent Application No. 2017-151894, filed on Aug. 4, 2017, the entire contents of which are incorporated herein by reference.

FIELD

The embodiments discussed herein are related to an inspection device and an inspection method.

BACKGROUND

In order to automatically perform an accept/reject testing of product appearance inspection in production lines, a method for automatically executing the accept/reject testing by obtaining an image of an inspection target with a camera has been proposed in recent years.

For example, there has been a method for improving inspection precision by selecting a main inspection logic again from a plurality of logics defined through an image processing algorithm (rule), depending on variations in production environments (see, for example, Japanese Laid-open Patent Application No. 2007-327848).

Meanwhile, there has been developed a method for automatically generating an image processing algorithm (machine learning) using images collected in advance and teacher data of the accept/reject testing on those images.

For example, there has been a method for switching a new algorithm by newly generating another image processing algorithm different from the ongoing image processing algorithm based on the images obtained, in the case where an image is input, which cannot be handled with the ongoing image processing algorithm during the operation of a line (see, for example, Japanese Laid-open Patent Application No. 2007-293732).

SUMMARY

According to an aspect of the embodiments, an inspection device includes a processor configured to execute a process, the process includes:

making an accept/reject testing on an inspection image through a first image inspection program in a group of image inspection programs including a plurality of learning-type image inspection programs of different generations, each of which satisfies a predetermined standard of fitness of the image inspection program with respect to a learning image; and replacing the first image inspection program with a second image inspection program in the group of image inspection programs which exhibits an optimum fitness with respect to the inspection image that has been misrecognized, when an operator makes the accept/reject testing on the inspection image that has undergone the accept/reject testing through the first image inspection program and finds the inspection image that has been misrecognized.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is an explanatory diagram illustrating one example of a data configuration of testing results of inspection images stored in a testing result DB;

FIG. 14 is an explanatory diagram illustrating one example of a data configuration including information on misrecognized inspection images, stored in a misrecognition DB;

FIG. 15 is a diagram illustrating one example of a data configuration for determining fitness when a second image inspection program is selected;

DESCRIPTION OF EMBODIMENTS

Figure 1:
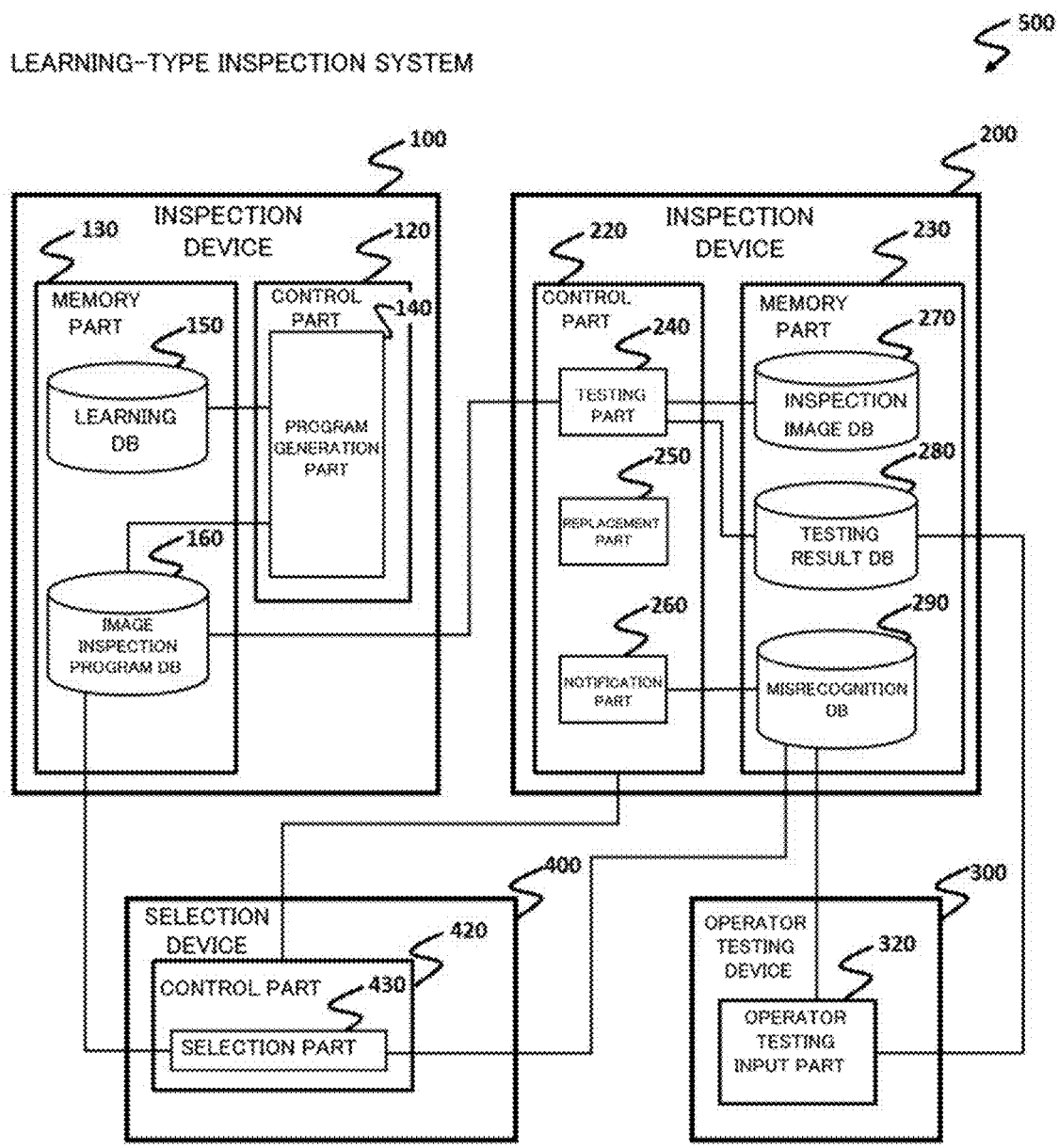
FIG. 1 is a diagram illustrating one example of a configuration of a learning-type inspection system including an inspection device.

In the above method described in Japanese Laid-open Patent Application No. 2007-327848, since a plurality of logics are defined by the rule, it is difficult to provide various and sufficient logics. Therefore, when images that have been misrecognized in terms of the accept/reject are obtained, the method is insufficient to select an image processing algorithm capable of making an accept/reject testing on the images, with higher precision.

In addition, in the above method described in Japanese Laid-open Patent Application No. 2007-293732, when images that have been misrecognized in terms of the accept/reject are obtained, it is necessary to prepare new learning images to be relearned. Therefore, generation of an image processing algorithm through the relearning requires a long period of time, and the image processing algorithm cannot be immediately applied to the production line, which is problematic.

In one aspect, the present disclosure has an object to provide an inspection device, an inspection method, and an inspection program, each of which can inspect an image using an image inspection program, where the program can make a correct accept/reject testing on an image that has been misrecognized in terms of the accept/reject, and can increase precision of the accept/reject testing in a shorter time than before.

In one aspect, it is possible to provide an inspection device, an inspection method, and an inspection program, each of which can inspect an image using an image inspection program, where the program can make a correct accept/reject testing on an image that has been misrecognized in terms of the accept/reject, and can increase precision of the accept/reject testing in a shorter time than before.

An inspection device of the present disclosure inspects an image using an image inspection program, where the program can make a correct accept/reject testing on an image that has been misrecognized in terms of the accept/reject, and is selected from a group of image inspection programs including a plurality of learning-type image inspection programs of different generations.

This makes it possible to provide an inspection device that can increase precision of the accept/reject testing in a shorter time than before.

Specifically, the inspection device includes a testing part, where the testing part makes an accept/reject testing on an inspection image using a first image inspection program in a group of image inspection programs, where the group includes a plurality of learning-type image inspection programs of different generations, each of which satisfies a predetermined standard of fitness of the image inspection program with respect to a learning image.

The "making the accept/reject testing on an inspection image" means that whether appearance of an inspection target is accepted or rejected is determined based on an image of the inspection target.

The "image inspection program" is a program for inspecting whether an inspection target is accepted or rejected based on an inspection image.

A fitness of the image inspection program is an indicator for evaluating whether the target program is a program capable of making a correct accept/reject testing. For example, the fitness of the image inspection program can be determined based on accuracy of the accept/reject testing of the image inspection program and a margin size from a boundary separating acceptance and rejection.

Generation of the learning-type image inspection programs of different generations can be realized, for example, through the evolutionary algorithm including the genetic programming or the genetic algorithm.

The group of the image inspection programs includes an image inspection program satisfying a predetermined standard of fitness. When the fitness is equal to or higher than the predetermined standard, the generated image inspection programs of any and all generations will be stored in the group of the image inspection programs.

Next, the inspection device includes a replacement part. When an operator makes the accept/reject testing on the inspection image that has undergone the accept/reject testing through the first image inspection program and finds the misrecognized inspection image, the replacement part replaces the first image inspection program with a second image inspection program in a group of image inspection programs which exhibits an optimum fitness with respect to the misrecognized inspection image.

The "being misrecognized" means the case where a result of the image accept/reject testing on an inspection image through the image inspection program does not match with a result of the image accept/reject testing on the inspection image by an operator. For example, the "being misrecognized" includes "misjudgment" and "false report". The misjudgment is the case where the image inspection program determines an image as an accepted image, while an operator determines the image as a rejected image. The false report is the case where the image inspection program determines an image as a rejected image, while an operator determines the image as an accepted image.

Whether the second image inspection program can make a correct accept/reject testing on a misrecognized image is evaluated using fitness. As described above, the fitness can be measured based on accuracy of the accept/reject testing of the image inspection program and a margin size from a boundary separating acceptance and rejection.

When an operator makes the accept/reject testing on an inspection image that has undergone the accept/reject testing through the first image inspection program and finds a misrecognized inspection image, the inspection device replaces the first image inspection program with the second image inspection program. This makes it possible for the inspection device to continue to inspect an image using the second image inspection program.

The second image inspection program is a program selected from a group of the image inspection programs including a plurality of learning-type image inspection programs of different generations and is a program capable of making a correct accept/reject testing on a misrecognized image.

Therefore, the inspection device can inspect an image using the image inspection program that can increase precision of the accept/reject testing in a shorter time than before, without executing time-consuming relearning.

Therefore, it is possible to provide an inspection device capable of increasing precision of the accept/reject testing in a shorter time than before, and to provide an effective inspection device for continuously operating production lines.

These flows executed by the inspection device are executed by a computer including a control part constituting the inspection device.

The inspection program may be stored in a recording medium. For example, this enables the inspection program to be installed in a computer. The recording medium having stored therein the inspection program may be a non-transitory recording medium. The non-transitory recording medium is not particularly limited and may be appropriately selected depending on the intended purpose. Examples of the non-transitory recording medium include a CD-ROM (Compact Disc-Read Only Memory) and a DVD-ROM (Digital Versatile Disc-ROM).

First Embodiment

Hereinafter, embodiments of the present disclosure will be described. However, the present disclosure should not be construed as being limited to the embodiments.

(Learning-Type Inspection System)

FIG. 1 is a diagram illustrating a configuration of a learning-type inspection system 500 including an inspection device 200 according to one embodiment of the present disclosure.

The learning-type inspection system 500 is, for example, a system capable of, with high precision, making an accept/reject testing on an inspection target in a production line by using an image. The learning-type inspection system 500 includes a learning device 100, an inspection device 200, an operator testing device 300, and a selection device 400.

The learning device 100 is a device configured to generate an image inspection program, which is used for inspection, and includes a control part 120 and a memory part 130.

The control part 120 includes a program generation part 140. The memory part 130 includes a learning database 150 and an image inspection program database 160. Hereinafter, the "database" may be referred to as "DB".

The inspection device 200 is a device configured to make an accept/reject testing on appearance of an inspection target using an image, and includes a control part 220 and a memory part 230.

The control part 220 includes a testing part 240, a replacement part 250, and a notification part 260. The memory part 230 includes an inspection image database (inspection image DB) 270, a testing result database (testing result DB) 280, and a misrecognition database (misrecognition DB) 290.

The operator testing device 300 is a device configured to input results of the accept/reject testing by an operator on an inspection image that has undergone the accept/reject testing using the image inspection program. The operator testing device 300 includes an operator testing input part 320.

The selection device 400 is a device configured to select an image inspection program that makes a correct accept/reject testing on a misrecognized image, and includes a control part 420.

Next, the learning device 100 will be described in detail.

<Learning Device>

The learning device 100 generates an image inspection program to be used for testing.

The learning device 100 includes a control part 120 and a memory part 130. The control part 120 controls the entire learning device 100.

The control part 120 generates the image inspection program in a program generation part 140 by using learning data stored in a learning DB 150 of the memory part 130. The image inspection program DB 160 of the memory part 130 stores the generated image inspection programs, as the group of the image inspection programs.

The learning DB 150 stores images to be learned and information on the results of the accept/reject testing by an operator which are linked to the images.

Figure 2:
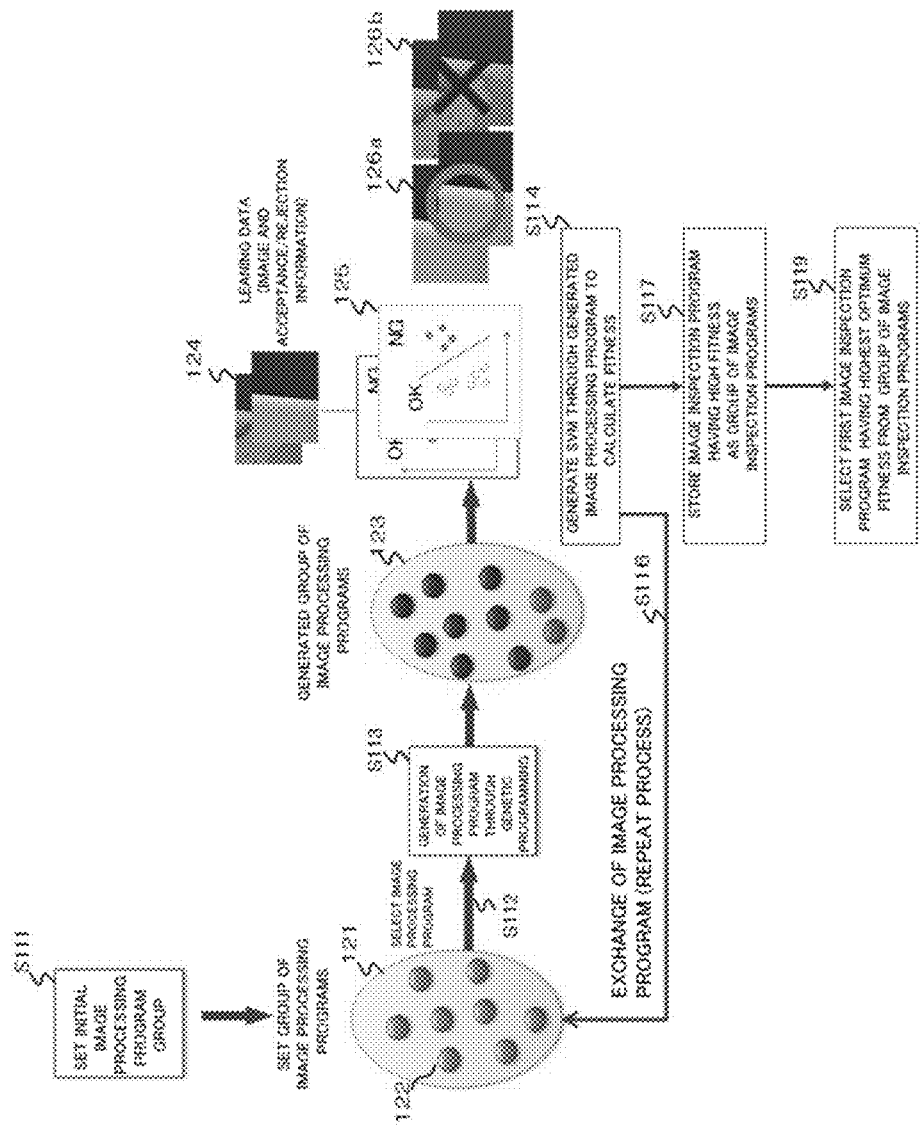
FIG. 2 is a diagram illustrating one example of a procedure for generating an image inspection program.

FIG. 2 is a block diagram illustrating a procedure for generating the image inspection program that is generated in the learning device 100 and used for the inspection.

The image inspection program is generated through the evolutionary algorithm such as the genetic programming or the genetic algorithm. Hereinafter, a procedure for generating the image inspection program will be described by exemplifying the generation through the genetic programming.

First, the image inspection program will be described in order to describe the procedure for generating the image inspection program illustrated in FIG. 2.

Figure 3:
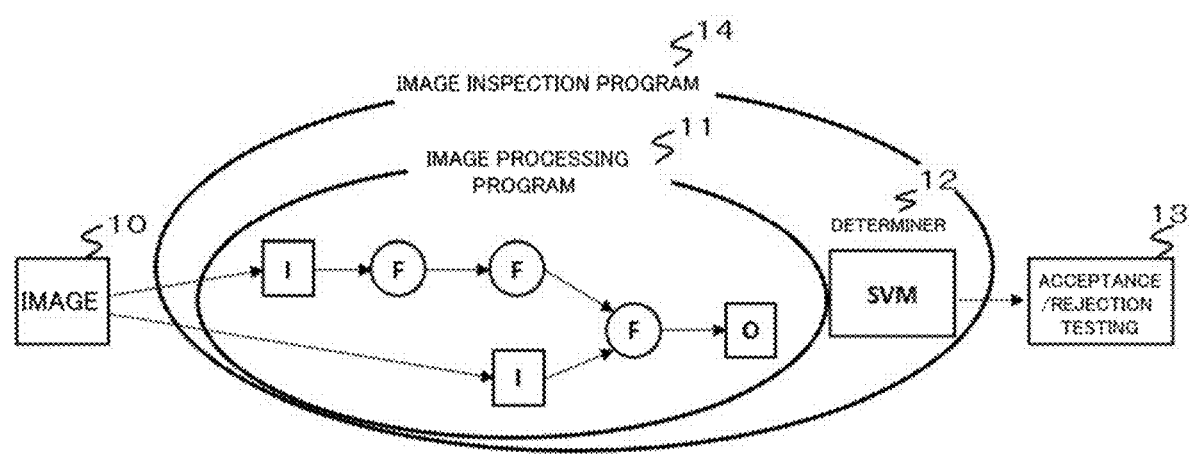
FIG. 3 is a diagram illustrating one example of an image inspection program.

The image inspection program includes, as illustrated in FIG. 3, for example, an image processing program 11 and a determiner 12. The image processing program 11 includes one or more partial programs. For example, as illustrated in FIG. 3, the image processing program is defined by a tree structure. In FIG. 3, "F" represents an image filter, "I" represents an input terminal, and "O" represents an output terminal.

As illustrated in FIG. 3, the image inspection program 14 determines an image characteristic value of an image 10 as an inspection image, with the image processing program 11. The determiner 12 makes an accept/reject testing 13 based on the image characteristic value of the image 10.

Referring back to FIG. 2, the procedure for generating the image inspection program in the program generation part 140 of the learning device 100 will be described hereinafter by focusing on the generation of the image processing program through the genetic programming. Here, it will be described with reference to a flowchart diagram illustrating one example of generation of an image inspection program illustrated in FIG. 8.

First, the program generation part 140 sets an initial image processing program group including a plurality of image processing programs (step S111).

Next, the program generation part 140 appropriately selects an image processing program from a group 121 of image processing programs that has been set to include a plurality of the image processing programs 122 (step S112). An image filter is randomly selected from a plurality of image filters that have been prepared in advance, and is incorporated into a node of each image processing program. The program generation part 140 randomly extracts two parent image processing programs from the set group 121 of image processing programs.

Then, the program generation part 140 subjects the two parent image processing programs to an evolutionary process processing through the genetic programming. The program generation part 140 generates two or more offspring image processing programs (step S113). In the evolutionary process, the program generation part 140 subjects the two parent image processing programs to a crossover processing and a mutation processing, which will be described hereinafter. In the program generation part 140, three or more offspring image processing programs may be generated by subjecting the two parent image processing programs to different crossover processings or different mutation processings. As described above, the program generation part 140 generates a group 123 of image processing programs.

Next, the program generation part 140 determines each of the image processing programs generated through the evolutionary process in the group 123 of the image processing programs for an image characteristic value with respect to each input image of learning data 124. Then, a determiner 125 configured to make an accept/reject testing is generated.

The learning data 124 includes learning images and information on the results of the accept/reject testing on the learning images by an operator which are linked to the images.

Examples of the determiner 125 include SVM (Support Vector Machine), Bayes recognition, and neural network. In the embodiments of the present disclosure, the SVM is used.

The program generation part 140 determines each input image of the learning data 124 for fitness based on accuracy of the accept/reject testing of the image inspection program and a margin size from a boundary separating acceptance and rejection (step S114).

When a result of the accept/reject testing of a learning image through the image inspection program matches with a result of the accept/reject testing which is provided by an operator and is linked to the learning image (i.e., 126*a* in FIG. 2), the image inspection program is a program capable of correctly making the accept/reject testing. Meanwhile, when the result of the accept/reject testing of the learning image through the image inspection program does not match with the result accept/reject testing by the operator (i.e., 126*b* in FIG. 2), the image inspection program is a program that cannot correctly make the accept/reject testing.

Here, when the image inspection program can correctly make the accept/reject testing on all the learning data, accuracy of the image inspection program is 100%.

In the program generation part 140, when the image inspection program having the high fitness is not generated, a part of the image processing program of the image inspection program is replaced as a parent program of the next generation of the genetic programming (step S116). As a result, a group of the image processing programs of the next generation is generated.

In the program generation part 140, when an image inspection program having a high fitness is generated, the aforementioned image inspection program is stored in an image inspection program DB as a group of the image inspection programs (step S117). The image inspection program stored in the image inspection program DB stores generated image inspection programs of any and all generations so long as they have high fitness. For example, the group of the image inspection programs includes image inspection programs of any and all generations such as image inspection programs of the immediately-preceding generation and image inspection programs of past-generations.

Until an image inspection program satisfying fitness of a predetermined high standard is generated, the program generation part 140 replaces a part of the image processing program of the image inspection program as a parent program of the next generation of the genetic programming (step S116).

In the program generation part 140, until the image inspection program satisfying fitness of the predetermined high standard is generated, generation of the image inspection program is repeated, based on the aforementioned genetic programming method.

The program generation part 140 selects an image inspection program exhibiting an optimum fitness from the group of the image inspection programs (step S119). Here, the image inspection program exhibiting the optimum fitness means an image inspection program having a maximum accuracy and a maximum margin.

Specifically, the program generation part 140 selects the image inspection program exhibiting the optimum fitness according to the procedure described in 1) to 3) below.

1) Image inspection programs that can make a correct rejection determination on all the learning images that have been determined as rejection by the operator, are selected.

2) Image inspection programs having a maximum accuracy are selected from the image inspection programs in the 1).

3) A program having a maximum margin is selected from the image inspection programs in the 2).

In addition, the program generation part 140 can select the image inspection program exhibiting the optimum fitness according to, for example, the procedure described in 4) and 5).

4) Image inspection programs having an accuracy of 100% are selected, where the image inspection programs having the accuracy of 100% can make the same accept/reject testing results on all the learning images as the accept/reject testing by an operator.

5) A program having a maximum margin is selected from the programs in the 4).

The program generation part 140 selects the image inspection program exhibiting the optimum fitness and another image inspection program in the group of the image inspection programs. Then, generation of the image inspection program terminates (step S120). The selected image inspection program exhibiting the optimum fitness is used as the first image inspection program in the inspection device 200. Moreover, another image inspection program in the group of the image inspection programs is used as a candidate program for selection as the second image inspection program in the selection device 400.

Next, the crossover processing and the mutation processing to be performed in the processing of the evolutionary process through the genetic programming (step S113) will be described hereinafter.

Figure 4:
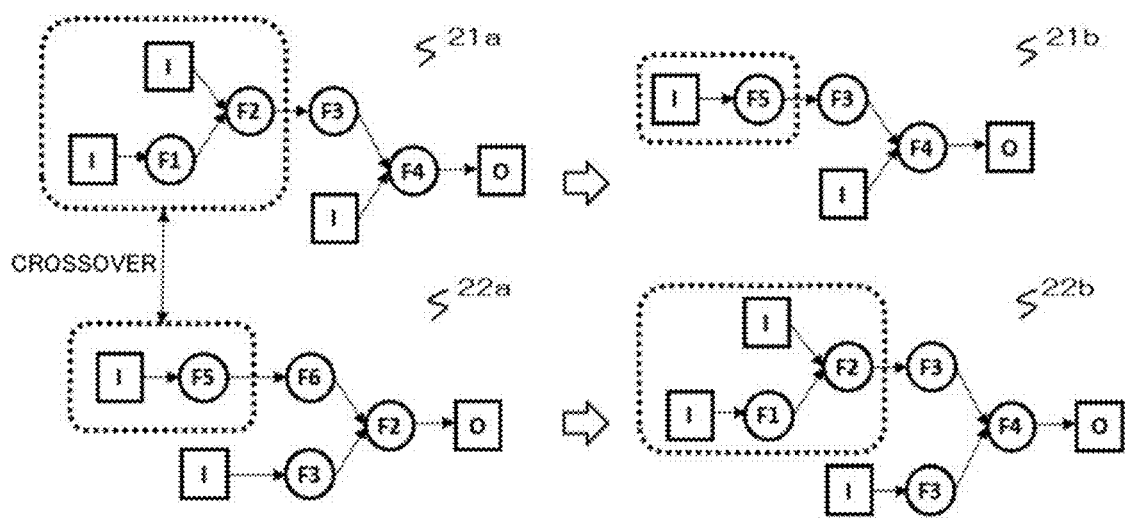
FIG. 4 is a diagram illustrating one example of a crossover processing in generation of an image processing program.

FIG. 4 is a diagram illustrating one example of a crossover processing. FIG. 4 represents a case where crossover is performed between a parent image processing program 21*a* and a parent image processing program 22*a* to generate an offspring image processing program 21*b* based on the parent image processing program 21*a* and an offspring image processing program 22*b* based on the parent image processing program 22*a*.

The parent image processing program 21*a* includes image filters F1, F2, F3, and F4. The parent image processing program 22*a* includes image filters F2, F3, F5, and F6. Here, a node of the image filter F2 in the parent image processing program 21*a* and a node of the image filter F5 in the parent image processing program 22a are selected as a portion at which the crossover is performed.

In the crossover processing, for example, not only the selected nodes but also nodes hierarchally lower than the selected nodes are used. Therefore, in the example of FIG. 4, "image filters F2 and F1, a node of the input terminal connected to one side of the image filter F2, and a node of the input terminal connected to the image filter F1" in the parent image processing program 21a and "image filter F5 and a node of the input terminal connected to the image filter F5" in the parent image processing program 22a are exchanged with each other. Through such a crossover, the offspring image processing program 21b including image filters F3, F4, and F5 and the offspring image processing program 22b including the image filter F1, the image filter F2, the image filter F4, and two image filters F3 are generated.

Figure 5:
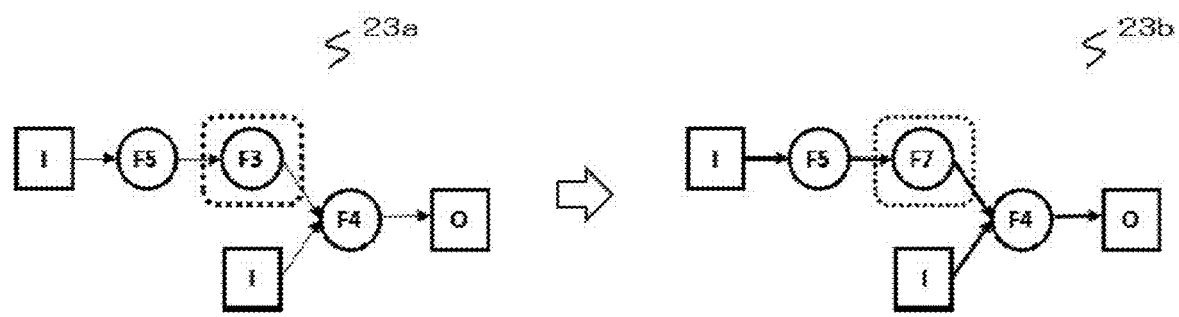
FIG. 5 is a diagram illustrating one example of a mutation processing in generation of an image processing program.

FIG. 5 is a diagram illustrating one example of a mutation processing. In FIG. 5, an image processing program 23a includes image filters F3, F4, and F5. For example, the image processing program 23a may be a parent image processing program extracted from the group 121 of image processing programs or may be an image processing program obtained by extracting a parent image processing program from the group 121 of image processing programs and subjecting the parent image processing program to the crossover processing.

Here, a node of the image filter F3 in the image processing program 23a is selected as a portion at which mutation is performed, and an image filter F7 is selected as an image filter after the replacement through mutation. Note that, the image filter after the replacement through mutation is randomly selected from a plurality of image filters that have been prepared in advance. Through such a mutation processing, an offspring image processing program 23b including image filters F4, F5, and F7 are generated.

Next, the filters of the image processing program 11 constituting the image inspection program 14 illustrated in FIG. 3 will be described.

Figure 6:
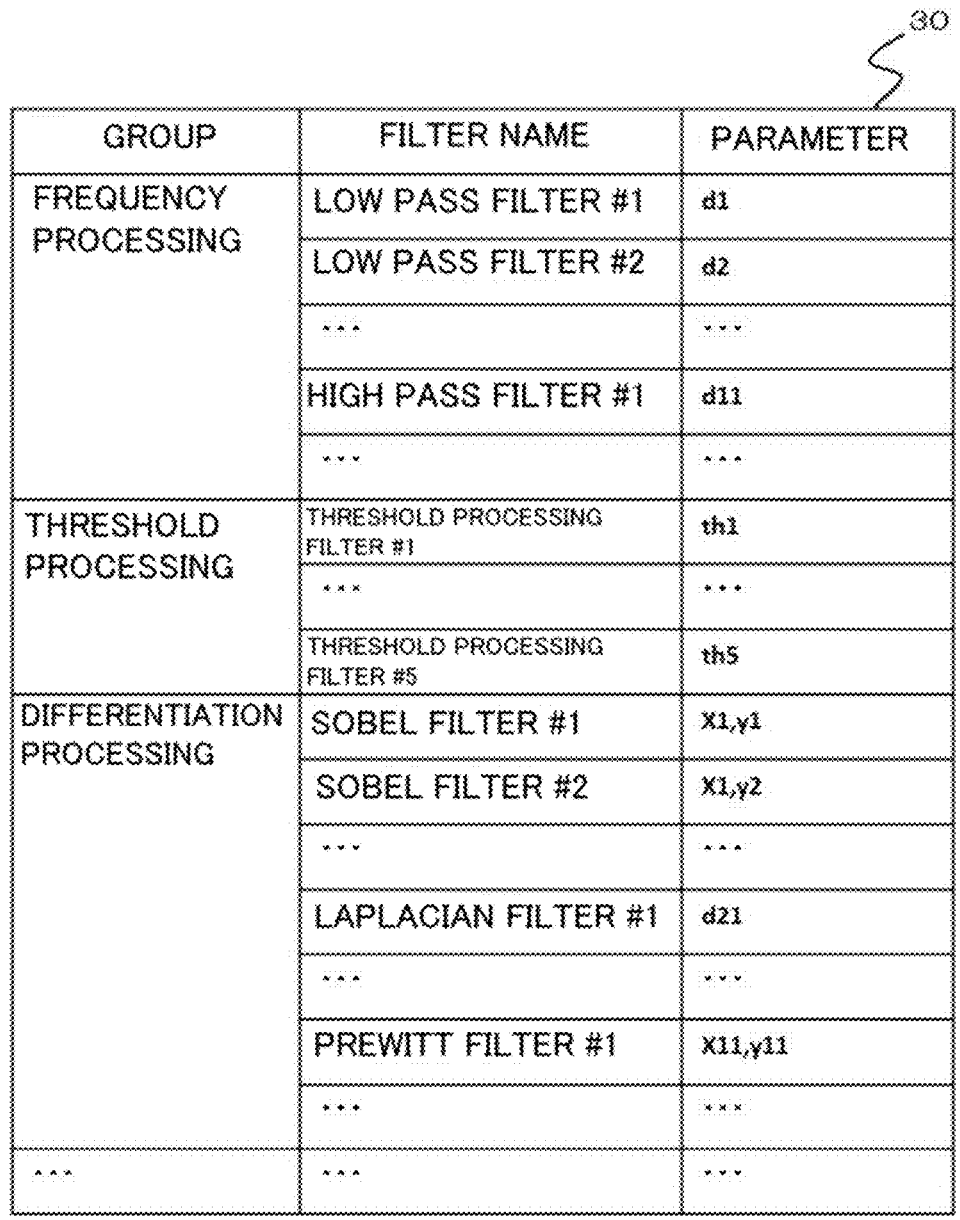
FIG. 6 is a diagram illustrating one example of a group of filters used in generation of an image processing program.

FIG. 6 illustrates an example of the kind of filters. Examples of the filters include filters executing the frequency processing, filters executing the threshold processing, and filters executing the differentiation processing.

Examples of the filters executing the frequency processing include low pass filters and high pass filters. Examples of the filters executing the threshold processing include filters processing a plurality of thresholds different in preset parameter. Examples of the filters executing the differentiation processing include Sobel filters, Laplacian filters, and Prewitt filters.

In FIG. 6, the filters having the same name but having a different number mean that the filters are different in parameter setting. For example, the low pass filter #1 and the low pass filter #2 are different in the parameter of cutoff frequency. Combination of a plurality of filters different in parameters described in FIG. 6 makes it possible for the program generation part 140 to generate various image processing programs.

The SVM used in the present embodiment as the determiner 12 of the image inspection program 14 in FIG. 3 will be described.

Figure 7:
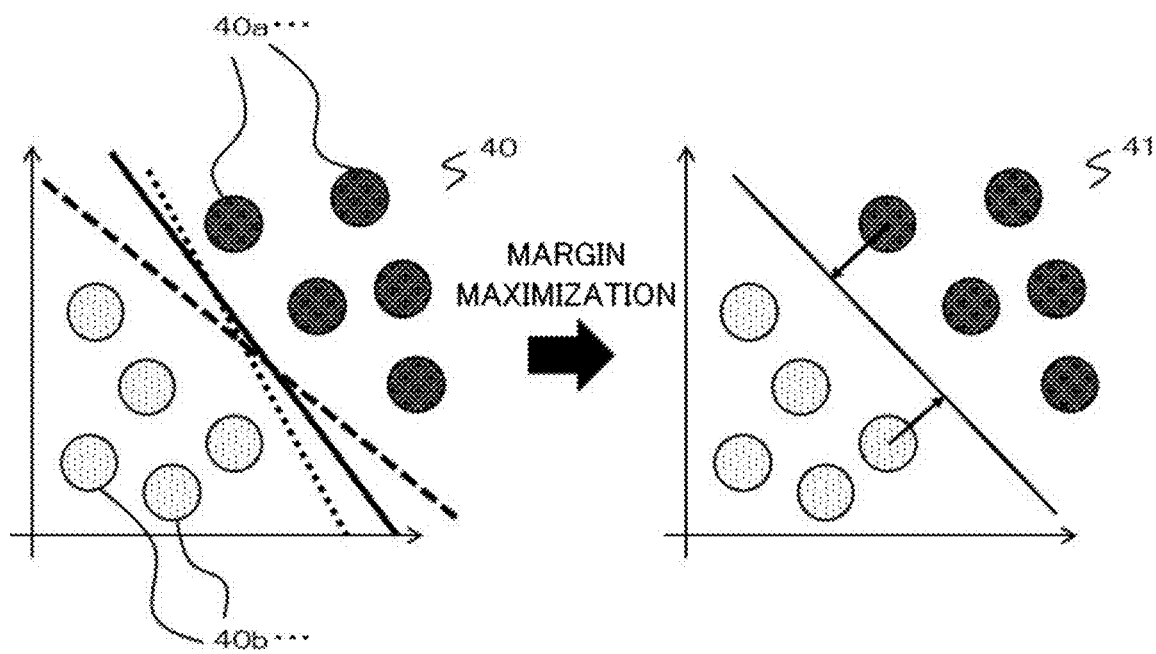
FIG. 7 is a diagram illustrating one example of SVM (Support Vector Machine) determining a maximum margin.

The SVM classifies an image characteristic value of an input image 10 obtained through the image processing program 11. As described in the left-hand FIG. 40 of FIG. 7, various lines, as presented by the solid line and the dotted lines, can be drawn (classification) between a group of the image characteristic values 40a and a group of the image characteristic values 40b arranged in a space (on a plane). When various lines can be drawn, the SVM draws a line (classification) so as to provide a maximum margin (distance between a boundary line and an image characteristic value near the boundary line) as described in the right-hand FIG. 41 of FIG. 7.

Figure 8:
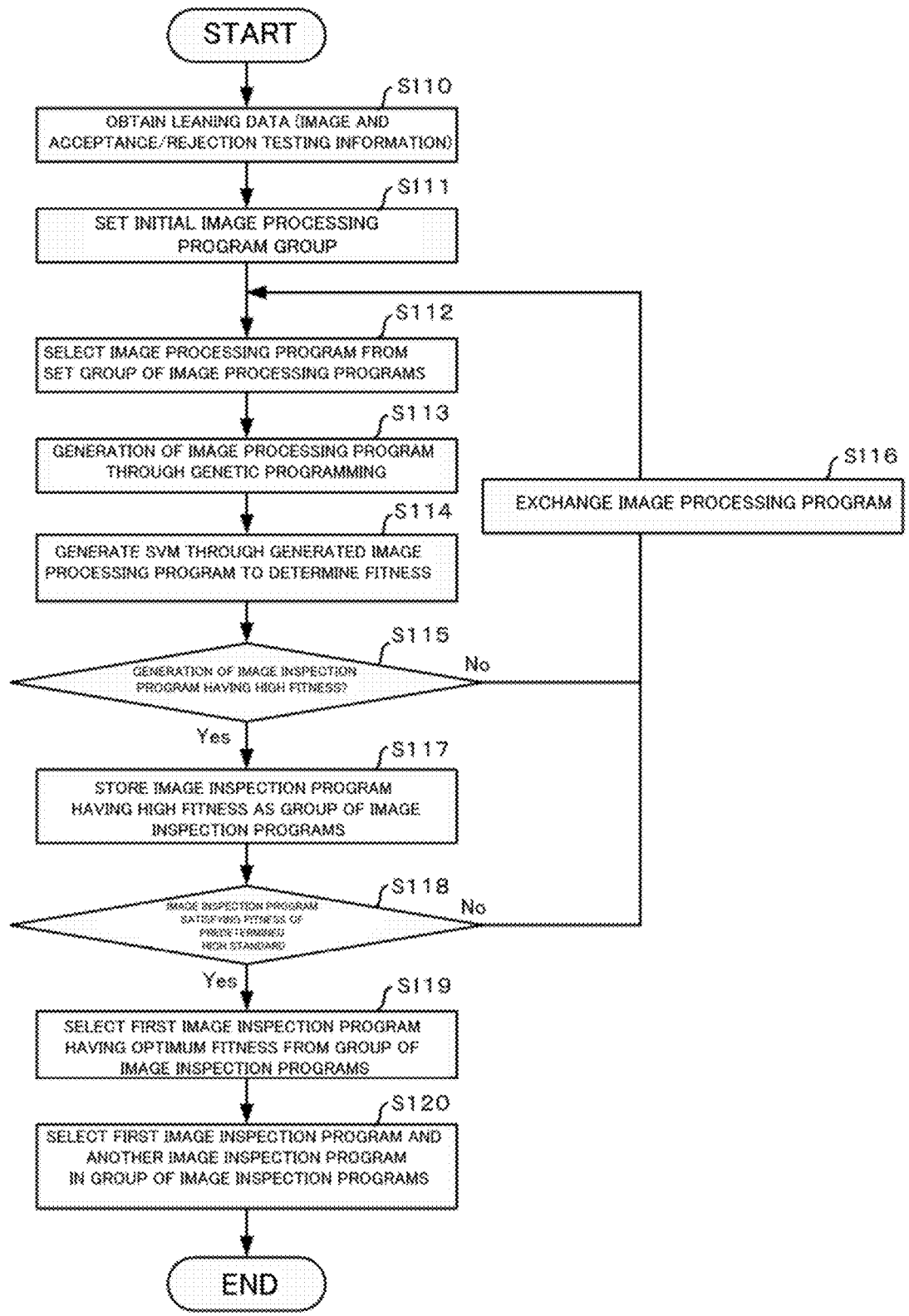
FIG. 8 is a flowchart illustrating one example of generation of an image inspection program in a learning-type inspection system.

Next, the generation of the image inspection program will be described in detail. FIG. 8 is a flowchart illustrating one example of generation of an image inspection program in the program generation part 140 of the learning device 100. Hereinafter, it will be described with reference to FIG. 1.

In the step S110, the program generation part 140 of the control part 120 of the learning device 100 obtains the learning data (image•accept/reject information) 150 stored in the learning DB 150 of the memory part 130. Then, the flow moves to the S111.

In the step S111, the program generation part 140 sets an initial image processing program group. Then, the flow moves to the S112.

In the step S112, the program generation part 140 selects an image processing program from the set group of the image processing programs. Then, the flow moves to the S113.

In the step S113, the program generation part 140 generates an image processing program through the genetic programming. Then, the flow moves to the S114.

In the step S114, the program generation part 140 generates the SVM through the generated image processing program and then fitness is determined. Then, the flow moves to the S115.

In the step S115, the program generation part 140 determines whether an image inspection program having a high fitness is generated. When the program generation part 140 determines that the image inspection program having the high fitness is generated, the flow moves to the S117. Meanwhile, when the program generation part 140 determines that the image inspection program having the high fitness is not generated, the flow moves to the S116.

In the step S116, the program generation part 140 replaces the image processing program. Then, the flow moves back to the S112.

In the step S117, the program generation part 140 stores the image inspection program having the high fitness as the group of the image inspection programs in the image inspection program DB 160. Then, the flow moves to the S118.

In the step S118, the program generation part 140 determines whether an image inspection program satisfying fitness of a predetermined high standard is generated. When the program generation part 140 determines that the image inspection program satisfying fitness of the predetermined high standard is generated, the flow moves to the S119. Meanwhile, when the program generation part 140 determines that the image inspection program satisfying fitness of the predetermined high standard is not generated, the flow moves to the S116. In the step S116, as described above, the program generation part 140 exchanges the image processing program. Then, the flow moves back to the S112. Thereby, until the image inspection program satisfying fitness of the predetermined high standard is generated based on the parent program of the next generation exchanged in the step 116, generation of the image inspection program through the genetic programming is continued.

In the step S119, the program generation part 140 selects a first image inspection program exhibiting an optimum fitness from the group of the image inspection programs. Then, the flow moves to the S120. Note that, a specific method for selecting the first image inspection program exhibiting the optimum fitness is as described above.

In the step S120, the program generation part 140 selects the first image inspection program having the highest fitness and another image inspection program in the group of the image inspection programs. Then, the present flow terminates.

A hardware configuration of the learning device 100 includes the respective parts of a CPU (Central Processing Unit), a main memory device, an auxiliary memory device, an input device, an output device, and a communication I/F. These respective parts are connected to each other via a bus.

The CPU is a processing device configured to execute various controls and operations. The CPU realizes various functions by executing OS (Operating System) or programs stored in, for example, the main memory device. That is, the CPU functions as the control part 120 of the learning device 100 by executing learning programs in the present embodiments.

The main memory device stores, for example, various programs and data necessary for executing the various programs.

The main memory device includes a ROM (Reed Only Memory) and a RAM (Random Access Memory), each of which is not illustrated.

The ROM stores, for example, various programs such as a BIOS (Basic Input/Output System).

The RAM functions as a working area to be developed when various programs stored in the ROM are executed by the CPU. The RAM is not particularly limited and may be appropriately selected depending on the intended purpose. Examples of the RAM include DRAM (Dynamic Random Access Memory) and SRAM (Static Random Access Memory).

The auxiliary memory device is not particularly limited and may be appropriately selected depending on the intended purpose, so long as it can store various pieces of information. Examples of the auxiliary memory device include solid state drives and hard disk drives. Moreover, the auxiliary memory device may be a portable memory device such as a CD (Compact Disc) drive, a DVD (Digital Versatile Disc) drive, or a BD (Blu-ray (Registered Trademark) Disc) drive.

The input device is not particularly limited and may be appropriately selected from known ones so long as the input device can receive various demands to the learning device 100. Examples of the input device include keyboards, mice, and touch panels.

As the output device, a display or a speaker can be used. The display is not particularly limited and may be appropriately selected from known ones. Examples of the display include liquid crystal displays and organic EL displays.

The communication interface (communication I/F) is not particularly limited and may be appropriately selected from known ones. Examples of the communication interface include wireless communication devices and cable communication devices.

Through the aforementioned hardware configuration, the processing function of the learning device 100 can be realized.

Note that, the learning device 100 may be a part of cloud that is a group of computers on the network.

Next, the inspection device 200 will be described in detail.

<Inspection Device>

The inspection device 200 is a device configured to determine whether an inspection image is accepted or rejected using the image inspection program.

When the image inspection program used does not make a correct accept/reject testing on an inspection image, the inspection device 200 replaces the image inspection program used with another image inspection program that can correctly make the accept/reject testing on the misrecognized image.

A hardware configuration and a function configuration of the inspection device 200 will be described.

<<Hardware Configuration of Inspection Device>>

Figure 9:
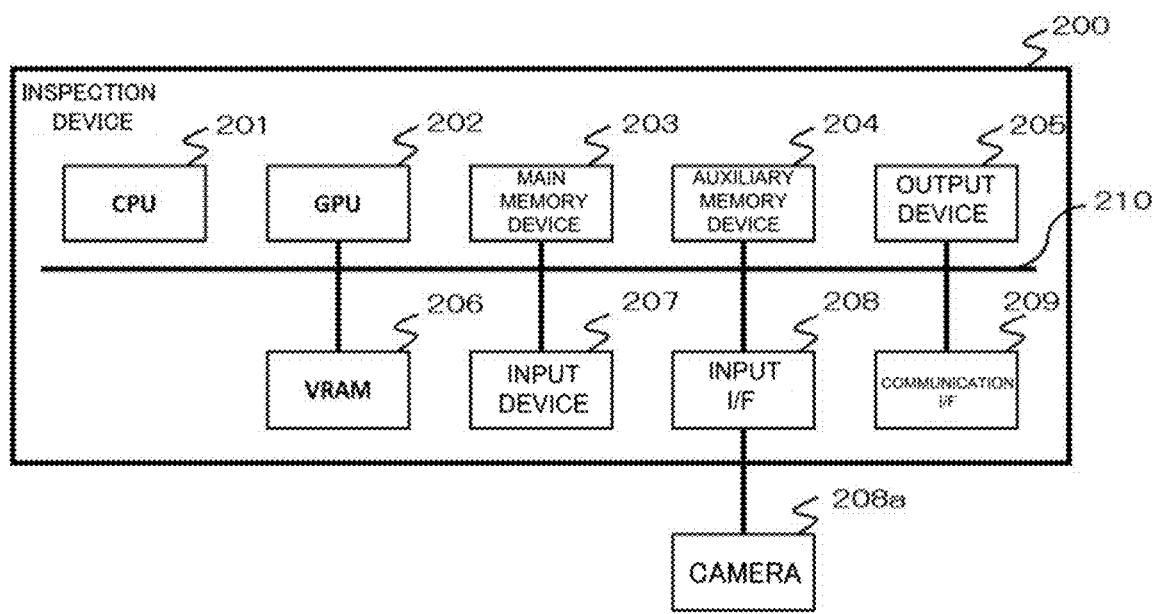
FIG. 9 is a block diagram illustrating one example of a hardware configuration of an inspection device.

FIG. 9 is a block diagram illustrating one example of a hardware configuration of the inspection device 200.

As described in FIG. 9, the inspection device 200 includes the respective parts below. The respective parts are connected to each other via a bus 210.

The CPU 201 is a processing device configured to execute various controls and operations. The CPU 201 realizes various functions by executing OS or programs stored in, for example, the main memory device 203. That is, the CPU 201 functions as the control part 220 of the inspection device by executing the inspection programs in the present embodiments. In the present embodiments, the inspection device 200 includes a GPU (Graphics Processing Unit) 202 in order to execute the image processing.

The CPU 201 controls operation of the entire inspection device 200. In the present embodiments, a device configured to control operation of the entire inspection device 200 is the CPU 201. However, the device is not limited to the above and may be, for example, FPGA (Field Programmable Gate Array).

The inspection program and various databases are not necessarily stored in, for example, the main memory device 203 or the auxiliary memory device 204. The inspection program and various databases may be stored in other information processing devices connected to the inspection device 200 via, for example, Internet, LAN (Local Area Network), or WAN (Wide Area Network). The inspection device 200 may execute the program by obtaining the inspection program and the various databases from these other information processing devices.

The main memory device 203 stores various programs and stores, for example, data necessary for executing the various programs.

The main memory device 203 includes a ROM and a RAM, each of which is not illustrated.

The ROM stores various programs such as a BIOS.

The RAM functions as a working area to be developed when various programs stored in the ROM are executed by the CPU 201. The RAM is not particularly limited and may be appropriately selected depending on the intended purpose. Examples of the RAM include DRAM and SRAM.

The auxiliary memory device 204 is not particularly limited and may be appropriately selected depending on the intended purpose, so long as it can store various pieces of information. Examples of the auxiliary memory device include solid state drives and hard disk drives. Moreover, the auxiliary memory device 204 may be a portable memory device such as a CD drive, a DVD drive, or a BD drive.

As the output device 205, a display, a speaker, etc. can be used. The display is not particularly limited and may be appropriately selected from known ones. Examples of the display include liquid crystal displays and organic EL displays.

The VRAM 206 is a memory region that holds data necessary for displaying an image on a display such as a monitor.

The input device 207 is not particularly limited and may be appropriately selected from known ones so long as the input device can receive various demands to the inspection device 200. Examples of the input device 207 include keyboards, mice, and touch panels.

The input interface (input I/F) 208 sends and receives data between the input I/F 208 and an external device connected thereto. In the present embodiments, a camera 208a as the external device is connected to the input I/F 208 and the input I/F 208 sends image data sent from the camera 208a to a processor.

The communication interface (communication I/F) 209 is not particularly limited and may be appropriately selected from known ones. Examples of the communication I/F 209 include wireless communication devices and cable communication devices.

With the aforementioned hardware configuration, the processing function of the inspection device 200 can be realized.

<<Function Configuration of Inspection Device>>

Referring back to FIG. 1, the inspection device 200 includes a control part 220 and a memory part 230. The control part 220 controls the entire inspection device 200.

The control part 220 includes a testing part 240, a replacement part 250, and a notification part 260.

The testing part 240 of the inspection device 200 makes the accept/reject testing on an inspection data image stored in an inspection image DB 270 of the memory part 230 using a first image inspection program exhibiting an optimum fitness generated in the learning device 100.

The testing part 240 stores results of the accept/reject testing of the inspection image obtained through the first image inspection program, in a testing result DB 280 of the memory part 230.

When the misrecognized image exceeds a predetermined standard value based on the information in a misrecognition DB 290 stored in the memory part 230, the notification part 260 of the inspection device 200 notifies a selection device 400, which will be described hereinafter, that the misrecognized image exceeds a predetermined standard value.

The "being misrecognized" means the case where a result of the image accept/reject testing on an inspection image through the image inspection program does not match with a result of the image accept/reject testing on the inspection image by an operator. For example, an operator makes the accept/reject testing on the inspection image that has undergone the accept/reject testing through the first image inspection program. As a result of the accept/reject testing by the operator, when the operator makes a different accept/reject testing on an image from the result of the accept/reject testing through the program, the image is considered as the "misrecognized image". The misrecognized image includes "misjudged image" and "falsely reported image". The "misjudged image" is an image that is determined as an "accepted image" through the image inspection program but is determined as a "rejected image" by the operator. The "falsely reported image" is an image that is determined as a "rejected image" through the image inspection program but is determined as an "accepted image" by the operator.

A procedure for determining a misrecognized image by an operator and construction of the misrecognition DB 290 will be described hereinafter in detail.

The standard as to whether the misrecognized image exceeds a predetermined standard value for the notification to the selection device 400 is not particularly limited and may be defined by the number or the quantity. For example, the number of the misrecognized images, a rate of the misrecognized image, and a degree of the misrecognition can be defined. For example, when the number of the misrecognized images exceeds a predetermined number, the selection device 400 is notified that the number of the misrecognized images exceeds a predetermined number.

A replacement part 250 of the inspection device 200 replaces the first image inspection program with the second image inspection program selected in the selection part 430 of the selection device 400. Here, the second image inspection program is an image inspection program that exhibits an optimum fitness on a misrecognized inspection image, which is selected from the group of image inspection programs.

Note that, a selecting procedure for the second image inspection program will be described hereinafter in detail.

Hereinafter, in the inspection device 200, a series of procedures between the accept/reject testing on an inspection image using the first image inspection program and replacement of the first image inspection program with the second image inspection program will be described with reference to FIG. 10.

Figure 10:
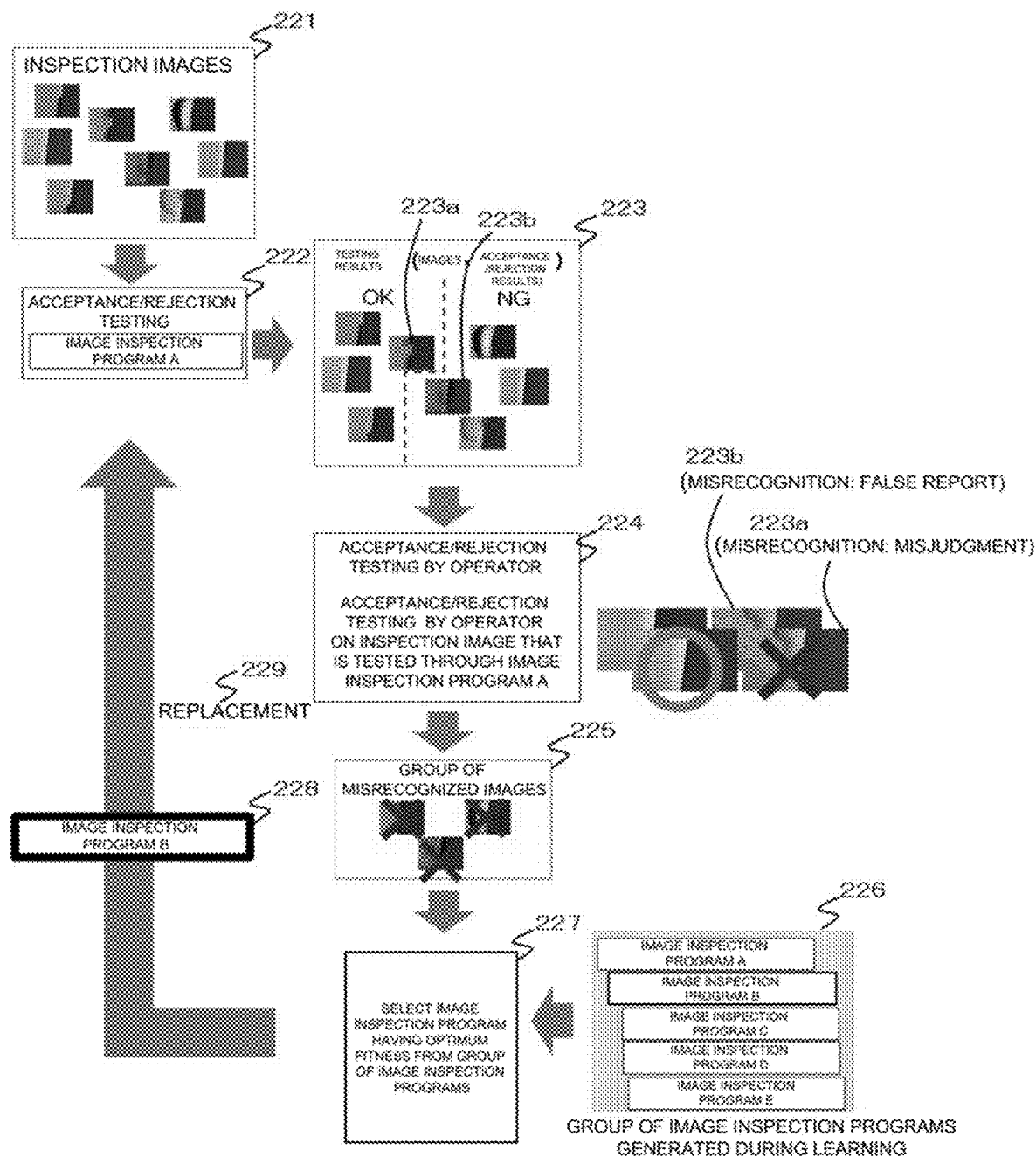
FIG. 10 is a diagram illustrating one example of a procedure between selection of and replacement with an image inspection program.
Figure 11:
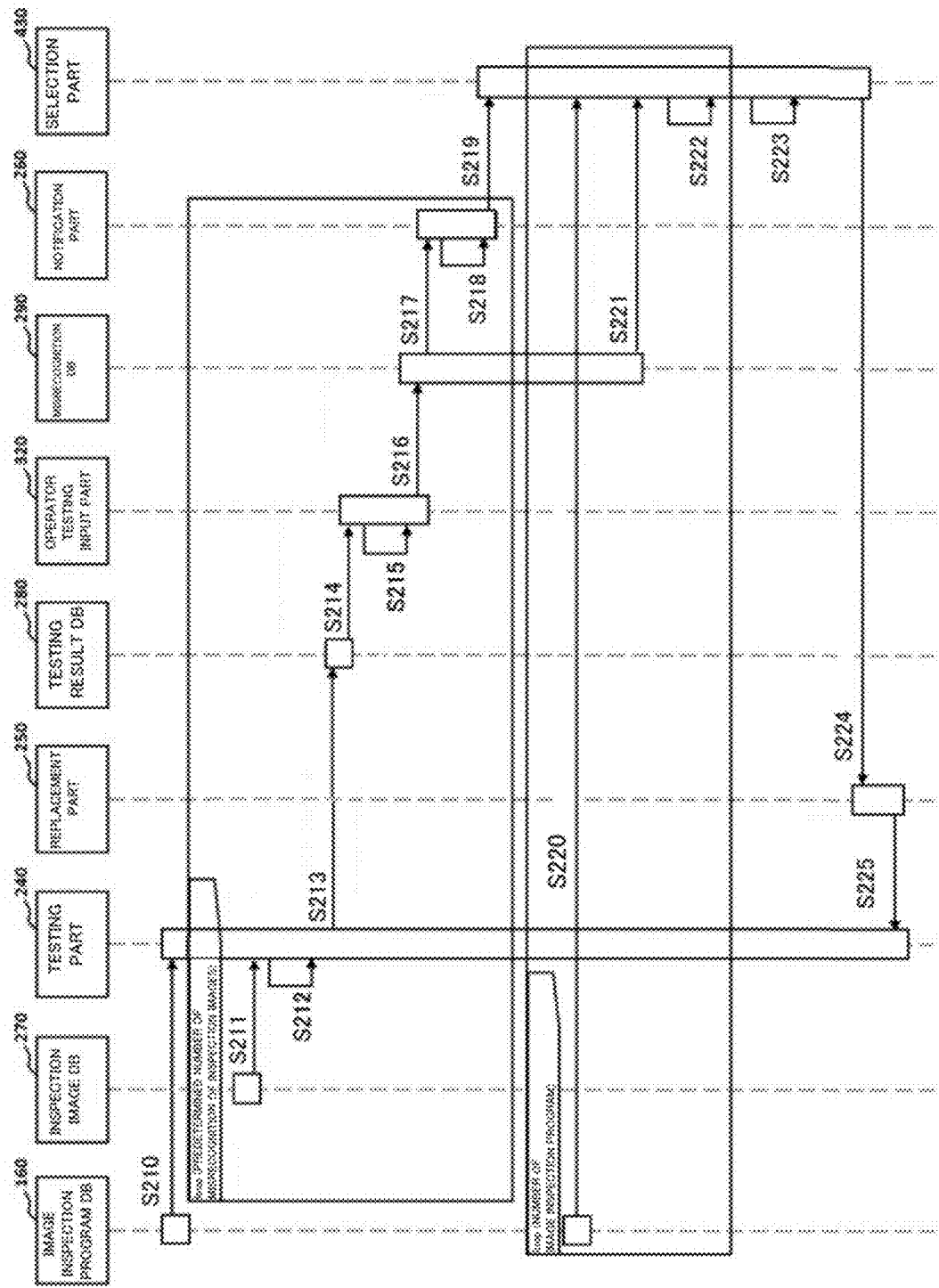
FIG. 11 is a sequence diagram illustrating one example of a flow between selection of and replacement with an image inspection program in a learning-type inspection system.

FIG. 10 is a block diagram illustrating a procedure after the accept/reject testing on an inspection image using the first image inspection program between selection of the second image inspection program and replacement of the first image inspection program with the second image inspection program. A sequence diagram of FIG. 11 illustrating one example of a procedure between selection of and replacement with the image inspection program will also be referred to.

First, in the testing part 240 of the inspection device 200, a first image inspection program A, which is an optimum image inspection program selected by the learning device 100, makes an accept/reject testing 222 on an inspection image 221 (step S212). In the testing part 240, the testing result DB 280 stores results 223 of the accept/reject testing on the inspection image through the first image inspection program A (step S213).

An operator makes an accept/reject testing 224 on the inspection image that has undergone the accept/reject testing through the first image inspection program A. The operator inputs results of the accept/reject testing that has been performed by the operator, in an operator testing input part 320 of an operator testing device 300, which will be described below (step S215). As a result of the accept/reject testing by the operator, when a result of the accept/reject testing on the inspection image through the image inspection program A matches with a result of the accept/reject testing on the inspection image by the operator, the image is considered as "correctly recognized inspection image". Meanwhile, when the result of the accept/reject testing on the inspection image through the image inspection program A does not match with the result of the accept/reject testing on the inspection image by the operator, the image is considered as "inspection misrecognized image". The misrecognized image includes "misjudged image" 223a and "falsely reported image" 223b. The "misjudged image" 223a is the case where the image inspection program determines an image as an accepted image, while an operator determines the image as a rejected image. The "falsely reported image" 223b is the case where the image inspection program determines an image as a rejected image, while an operator determines the image as an accepted image.

The operator testing input part 320 of the operator testing device 300 receives results of the accept/reject testing by the operator and sends the inspection device 200 information on the misrecognized image, which is obtained from the results of the accept/reject testing by the operator. The operator testing device 300 will be described hereinafter in detail.

In the inspection device 200, information on the misrecognized image, which is received from the operator testing device 300, is stored as a group 225 of misrecognized images in a misrecognition DB 290 (step S216).

When the notification part 260 of the inspection device 200 determines that the misrecognized image exceeds a predetermined standard (in the present embodiments, the predetermined standard is, for example, a predetermined number) based on the information in the misrecognition DB 290, the selection device 400 is notified that the misrecognized image exceeds a predetermined standard (step S218 and step S219).

The selection device 400 selects the second image inspection program according to notification from the notification part in the selection part 430 (step S223). The selection device 400 and the second image inspection program to be selected will be described in detail.

The inspection device 200 receives, from the selection device 400, the second image inspection program selected in the selection part 430. Then, the replacement part 250 of the inspection device 200 replaces the first image inspection program with the second image inspection program (step S225).

In FIG. 10, selection 228 of an image inspection program B is made from the group 226 of the image inspection programs. The image inspection program B is an image inspection program 227 exhibiting an optimum fitness.

Then, in FIG. 10, replacement 229 of the first image inspection program A with the second image inspection program B is made by the replacement part 250 (step S225).

After the image inspection program used in the testing part 240 is replaced with the second image inspection program B, the testing part 240 uses the replaced image inspection program B as the first image inspection program, to perform the accept/reject testing 222 on the inspection image 221. After that, when the image that has been misrecognized through the image inspection program B exceeds a predetermined number, the selection part 430 reselects a second image inspection program other than the image inspection program B from the group 226 of the image inspection programs. The replacement part 250 of the inspection device 200 replaces the first image inspection program B with the newly selected second image inspection program, using the reselected second image inspection program by the selection part 430.

Next, the operator testing device 300 will be described in detail below.

<Operator Testing Device>

Referring back to FIG. 1, the operator testing device 300 includes the operator testing input part 320.

The operator testing input part 320 receives the accept/reject testing by the operator on the inspection image, which has undergone the accept/reject testing through the first image inspection program.

The operator testing input part 320 sends the inspection device 200 information on the misrecognized image obtained from the result of the accept/reject testing by the operator. In the inspection device 200, the misrecognition DB 290 of the memory part 230 stores information on the received misrecognized image.

A procedure for inputting the accept/reject testing by the operator in the operator testing input part 320 of the operator testing device 300 will be described hereinafter with respect to FIG. 10 and FIG. 11.

The operator testing input part 320 obtains an inspection image and a result 223 of the accept/reject testing on the inspection image through the first image inspection program A, from the testing result DB 280 (step S214).

The operator makes the accept/reject testing 224 on the inspection image that has undergone the accept/reject testing through the first image inspection program. The operator inputs, to the testing input part 320, the result of the accept/reject testing made by the operator (step S215).

When a result of the accept/reject testing on the inspection image through the first image inspection program A matches with a result of the first accept/reject testing on the inspection image by the operator, the image is considered as "correctly recognized inspection image". Meanwhile, when the result of the accept/reject testing on the inspection image through the first image inspection program A does not match with the result of the accept/reject testing on the inspection image by the operator, the image is considered as "inspection misrecognized image". The misrecognized image includes "misjudged image" 223*a* and "falsely reported image" 223*b*. The "misjudged image" 223*a* is the case where the image inspection program determines an image as an accepted image, while an operator determines the image as a rejected image. The "falsely reported image" 223*b* is the case where the image inspection program determines an image as a rejected image, while an operator determines the image as an accepted image.

The operator testing input part 320 receives results of the accept/reject testing by the operator, and takes out the misrecognized image from the results of the accept/reject testing through the first image inspection program A and the results of the accept/reject testing by the operator (step S215).

The operator testing input part 320 sends information on the taken-out misrecognized image (including testing results of misjudgment and false report) to the inspection device 200 (step S216).

FIG. 12 illustrates one example of information on testing results (data configuration) on the inspection image through the first image inspection program, which is stored in a testing result DB. As illustrated in FIG. 12, in the present embodiments, the information includes data items such as "testing date and time", "variety information", "image ID", and "program testing result". Here, the "testing date and time" is date and time at which an inspection image is determined as to whether the inspection image is accepted or rejected through the first image inspection program. The "variety information" is not particularly limited so long as an inspection target can be identified. Examples of the "variety information" include names, symbols, and lot numbers with which an article of the inspection target can be identified. The "image ID" is an identifier that identifies an inspection image. The "program testing result" is a result of the accept/reject testing through the first image inspection program. In the table of FIG. 12, "OK" means acceptance determination and "NG" means rejection determination (similar to the other figures, "OK" means acceptance determination and "NG" means rejection determination).

Figure 13:
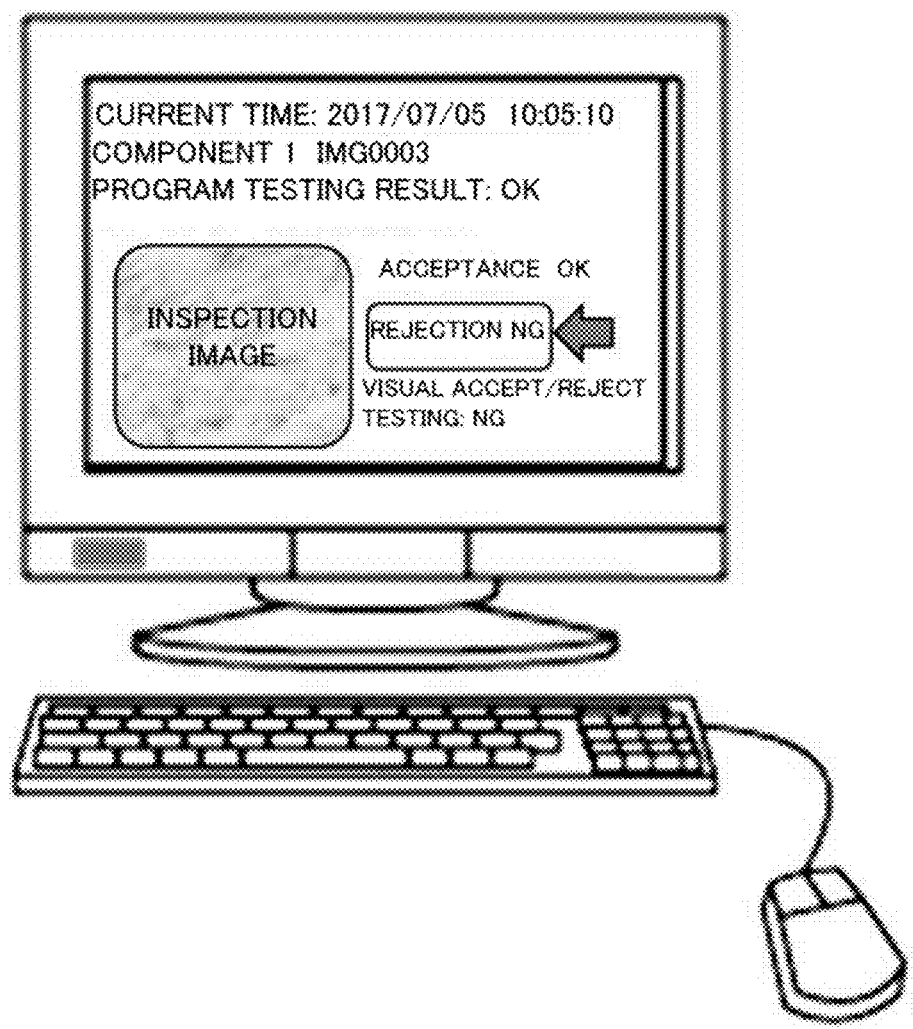
FIG. 13 is a diagram illustrating one example of a user interface where a testing result by an operator is input in an operator testing input part.

FIG. 13 is a diagram illustrating one example of a user interface where a testing result by an operator with respect to an inspection image that has undergone the accept/reject testing through the first image inspection program is input in an operator testing input part. FIG. 13 illustrates an example;

i.e., a visual accept/reject testing is NG where the first image inspection program makes the acceptance determination (OK) on an inspection image IMG0003, while an operator makes the rejection determination (NG) on the displayed inspection image.

FIG. 14 is a diagram illustrating one example of a data configuration including information on misrecognized inspection images, stored in a misrecognition DB. As illustrated in FIG. 14, in the present embodiments, data items such as "operator testing date and time", "visual accept/reject testing result", "accept/reject testing flag", "misjudgment flag", and "false report flag" are included, in addition to the information described in FIG. 12. Here, the "operator testing date and time" is date and time at which an operator makes the accept/reject testing on an inspection image. The "visual accept/reject testing result" is a result of the accept/reject testing by the operator.

The accept/reject testing flag is set based on results of the accept/reject testing made by both the first image inspection program and the operator. As described in FIG. 14, when the result of the accept/reject testing through the first image inspection program matches with the result of the accept/reject testing by the operator, the operator testing input part gives the accept/reject testing flag "1". Meanwhile, the result of the accept/reject testing through the first image inspection program does not match with the result of the accept/reject testing by the operator, the operator testing input part gives the accept/reject testing flag "0".

The operator testing input part can set the misjudgment flag or the false report flag for the misrecognized image where the accept/reject testing flag is "0".

As illustrated in FIG. 14, regarding the misrecognized image where the accept/reject testing flag is "0", when the first image inspection program determines an image as "OK" and the operator determines the image as "NG", the operator testing input part gives the misjudgment flag "1". The operator testing input part gives the "misjudgment flag "0" to images other than the images presenting the misjudgment flag "1". Regarding the misrecognized image where the accept/reject testing flag is "0", when the first image inspection program determines an image as "NG" and the operator determines the image as "OK", the operator testing input part gives the false report flag "1". The operator testing input part gives the false report flag "0" to images other than the image presenting the false report flag "1".

As described above, when the data items such as the misjudgment flag and the false report flag are set, the selection device 400 can easily obtain information on the misjudged image and the falsely reported image with the misjudgment flag and the false report flag being distinguished. This makes it possible to easily obtain information on the misjudged image, for example, in the case where the misjudged image is prioritized rather than the falsely reported image and the selection device 400 attempts to select the second image inspection program that can make a correct accept/reject testing on the misjudged image.

In the present embodiments, the misrecognition DB has a data configuration, which includes the case where a result of the accept/reject testing through the first image inspection program matches with a result of the accept/reject testing by the operator, and the case where the result of the accept/reject testing through the first image inspection program does not match with the result of the accept/reject testing by the operator (misrecognition). Note that, the misrecognition DB includes at least information on the misrecognized image. For example, the data configuration in FIG. 14 may be a data configuration of the misrecognition DB obtained by extracting only information on the misrecognized images presenting the accept/reject testing flag of "0".

The timing at which the operator testing device 300 works; i.e., the timing at which the operator confirms a result of the accept/reject testing on an image of the inspection target through the image inspection program is, for example, each case as described in the following case i), ii), or iii).

i) The operator regularly makes a confirmation. In this case, the operator confirms inspection images falling within a set term.

ii) When any problem occurs in a post-process in the production of a target, the operator confirms inspection images. In this case, the operator confirms inspection images produced in a term before and after the problem occurs.

iii) During the operation of a line, the operator confirms the accept/reject testing through the image inspection program (for example, the operator makes a confirmation by randomly extracting images). When the operator finds that the number of misrecognitions is increased, the operator makes a confirmation. In this case, for example, the operator confirms inspection images obtained during a predetermined term before a point of time at which the misrecognition is caused.

A hardware configuration of the operator testing device 300 includes the respective parts of a CPU, a main memory device, an auxiliary memory device, an input device, an output device, and a communication I/F. These respective parts are connected to each other via a bus. Description of the respective parts is the same as the descriptions of the respective parts in the learning device 100 and the inspection device 200. Therefore, the description is omitted here.

Next, a selection device 400 will be described in detail.

<Selection Device>

When the selection device 400 receives notification that the number of the misrecognized images exceeds a predetermined number from the notification part 260 of the inspection device 200, the selection device 400 selects the second image inspection program from a group of the image inspection programs stored in the image inspection program DB 160. The selection device 400 sends an image inspection program selected in a selection part 430 to the inspection device 200.

Referring back to FIG. 1, the selection device 400 includes a control part 420. The control part 420 includes the selection part 430 and controls the entire selection device 400.

The selection part 430 selects an image inspection program that makes a correct accept/reject testing on a misrecognized image, using the misrecognition DB 290 stored in the memory part 230 of the inspection device 200 and the image inspection program DB 160 stored in the memory part 130 of the learning device 100.

A procedure for selecting an image inspection program in the selection part 430 of the selection device 400 will be described with reference to FIG. 10 and FIG. 11.

A group 226 of the image inspection programs in FIG. 10 includes, for example, image inspection programs A, B, C, D, and E as an image inspection program having a high fitness selected through the learning device 100. The selection part 430 determines fitness of each image inspection program on a misrecognized image 225 using each image inspection program (e.g., image inspection programs B, C, D, and E) in the group of the image inspection programs (step S222).

The selection part 430 selects an image inspection program exhibiting an optimum fitness from the group of the image inspection programs (step S223).

Here, the image inspection program exhibiting the optimum fitness is, for example, an image inspection program having a maximum accuracy and a maximum margin.

Specifically, the selection part 430 selects the image inspection program exhibiting the optimum fitness according to, for example, the procedure described in 1) to 3).

1) Image inspection programs that can make a correct rejection determination on all the misjudged images (ratio of misjudgment: 0%) in misrecognized inspection images are selected.

2) Image inspection programs having a maximum accuracy are selected from the image inspection programs in the 1).

3) A program having a maximum margin is selected from the image inspection programs in the 2).

For example, a selection part 430 can select the image inspection program exhibiting the optimum fitness according to, for example, the procedure described in 4) and 5).

4) Image inspection programs having an accuracy of 100% are selected, where the programs can correctly make the accept/reject testing on all of the misjudged images and the falsely reported images in the misrecognized inspection images.

5) A program having a maximum margin is selected from the programs in the 4).

A method for selecting an image inspection program having a maximum accuracy and a maximum margin will be described in detail.

Here, as described in the above specific selection methods, when the second image inspection program that can make a correct rejection determination on all the misjudged images in the misrecognized inspection images is selected, it is possible to provide an inspection device capable of effectively preventing outflow of rejected goods.

In FIG. 10, the image inspection program B is selected as an image inspection program 228 exhibiting an optimum fitness.

The second image inspection program is selected from all the image inspection programs included in the group of the image inspection programs. It is important to select the image inspection program having the high fitness. In addition, image inspection programs of any and all generations such as image inspection programs of the immediately-preceding generation and image inspection programs of past-generations, which are included in the group of the image inspection programs, are selected.

The selection part 430 sends the selected second image inspection program exhibiting an optimum fitness to the inspection device 200. Then, the replacement part 250 of the inspection device 200 replaces the first image inspection program with the received second image inspection program (step S225).

When the selection part 430 determines that the group of the image inspection programs does not include any image inspection program exceeding a predetermined value of accuracy, selection of the second image inspection program in the selection part 430 terminates. When the second image inspection program cannot be selected, an operator will make a new image inspection program through relearning in the learning device 100.

FIG. 15 is a diagram illustrating one example of a data configuration for determining fitness of a second image inspection program when the second image inspection program is selected using an inspection image that has been misrecognized through the first image inspection program. For example, the image inspection programs B, C, D, and E in the group 226 of the image inspection programs are used to make the accept/reject testing on the inspection image has been misrecognized through the image inspection program A that is the first image inspection program 222. Results are presented in FIG. 15.

FIG. 15 presents: image IDs of inspection images that have been misrecognized through the image inspection program A; information on visual accept/reject testing on the above inspection images by the operator; testing results on the above inspection images through the image inspection programs B, C, D, and E; and information for determining fitness. Examples of the information for determining fitness include "testing value", "misjudgment", "false report", and "margin value", in the present embodiments.

As the "testing value", the value "1" or "0" is given, based on results of the accept/reject testing made by the operator and the image inspection program in the group of the image inspection programs. For example, in the selection part 430, when the testing result by the operator matches with the testing result through the image inspection program such as the image inspection program B, C, D, or E, the testing value "1" is given. Meanwhile, in the selection part 430, when the testing result by the operator does not match with the testing result through the image inspection program such as the image inspection program B, C, D, or E, the testing value "0" is given.

As the "misjudgment", the value "1" is given to the misjudged image in the misrecognized images that is given the testing value "0". For example, when the testing result by the operator is "NG" and the testing result through the image inspection program is "OK", the selection part 430 gives the "1" to the misjudged image. The selection part 430 gives the "0" to an image other than the above image.

As the "false report", the falsely reported image in the images that have been misrecognized and are given the testing value "0" is given the value "1". For example, when the testing result by the operator is "OK" and the testing result through the image inspection program is "NG", the selection part 430 gives the "1" to the falsely reported image. The selection part 430 gives the "0" to an image other than the above image.

The "margin value" is a distance between a boundary of SVM and an inspection image that has been misrecognized through each image inspection program such as the image inspection program B, C, D, or E.

In tables of FIG. 15, accuracy of each image inspection program is determined by the following formula (1) using the testing value.

$$\text{Accuracy} = \text{The sum of testing values/The total number of inspection images} \quad \text{Formula (1)}$$

The image inspection programs B and C do not misrecognize the inspection images. Therefore, the image inspection programs B and C are image inspection programs having an accuracy of 100% where all the testing values are "1".

In tables of FIG. 15, a ratio of misjudgment of each image inspection program is determined by the following formula (2) using the "misjudgment" value in the tables.

$$\text{Ratio of misjudgment} = \text{The sum of misjudgment values/The total number of inspection images} \quad \text{Formula (2)}$$

The image inspection program E is an image inspection program that misjudges the inspection image IMG0003. The image inspection programs B, C, and D are image inspection programs that do not misjudge the inspection images and do have a ratio of misjudgment of 0%.

In tables of FIG. 15, a ratio of false report of each image inspection program is determined by the following formula (3) using the value of the "false report" in the tables.

$$\text{Ratio of false report} = \text{The sum of false report values} / \text{Total number of inspection images} \quad \text{Formula (3)}$$

The image inspection programs D and E are image inspection programs that falsely report the inspection image IMG1532. The image inspection programs B and C are image inspection programs that do not falsely report the inspection images and do have a ratio of false report of 0%.

The evaluation of the margin (margin evaluation value) is determined by the following formula (4) using the margin value in the tables.

$$\text{Margin evaluation value} = \min(|\text{margin value when the testing value is 1}|) \quad \text{Formula (4)}$$

It is possible to select an image inspection program having the largest maximum margin by selecting an image inspection program having the largest margin evaluation value of the margin evaluation values of the respective programs.

In the image inspection programs B and C, all the testing values are "1". Therefore, a margin evaluation value, which is a minimum value of absolute values of margin values in each program, is determined. The image inspection program B has a margin evaluation value of 0.8, and the image inspection program C has a margin evaluation value of 0.5.

From the results of the image inspection programs B, C, D, and E in FIG. 15, specific procedures where the selection part 430 selects the second image inspection program exhibiting an optimum fitness with respect to the misrecognized inspection image will be described hereinafter.

(a) An image inspection program having a ratio of misjudgment of 0% is selected. From the results presented in FIG. 15, the image inspection programs B, C, and D are selected.

(b) Next, programs having the highest accuracy are selected. From the results presented in FIG. 15, the image inspection program B and C are selected. The image inspection program B and C present a ratio of misjudgment of 0%, a ratio of false report of 0%, and an accuracy of 100%.

(c) Moreover, the image inspection program having the largest margin evaluation value is selected from the image inspection programs B and C having the highest accuracy. From the results presented in FIG. 15, the image inspection program B having a larger margin evaluation value is selected from the image inspection programs B and C each having an accuracy of 100%.

From the results presented in FIG. 15, the selection part 430 selects the image inspection program B as a second image inspection program having the highest accuracy and the largest margin.

Figure 16:
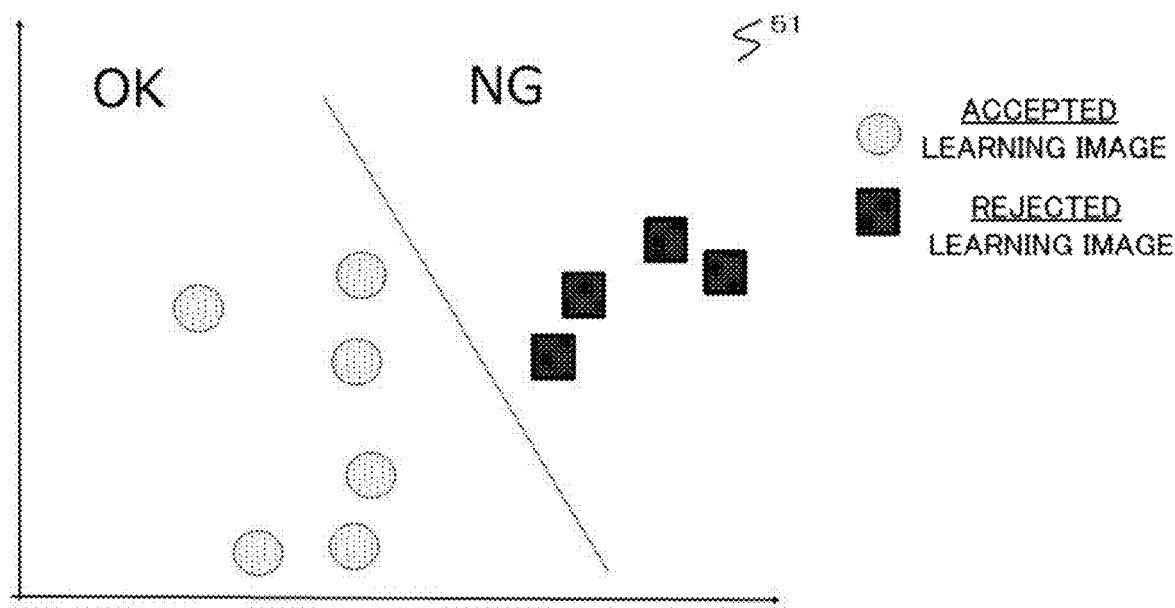
FIG. 16 is a diagram illustrating one example of an accept/reject testing through the SVM.
Figure 17:
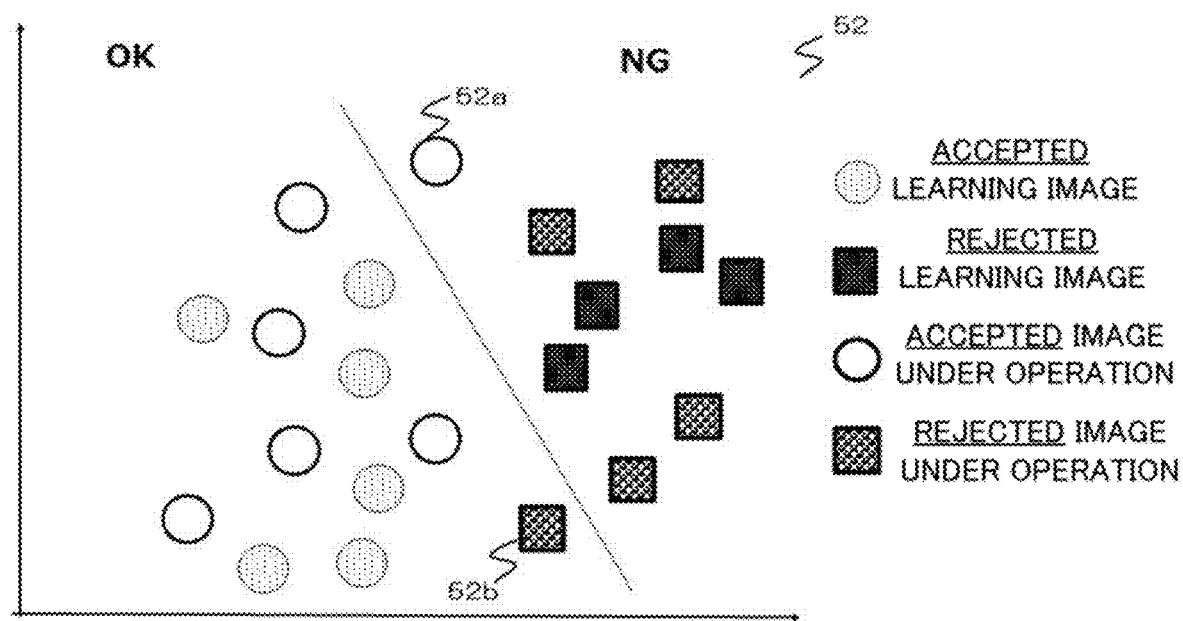
FIG. 17 is a diagram illustrating one example of an erroneous determination through the SVM when misrecognized data appear.
Figure 18:
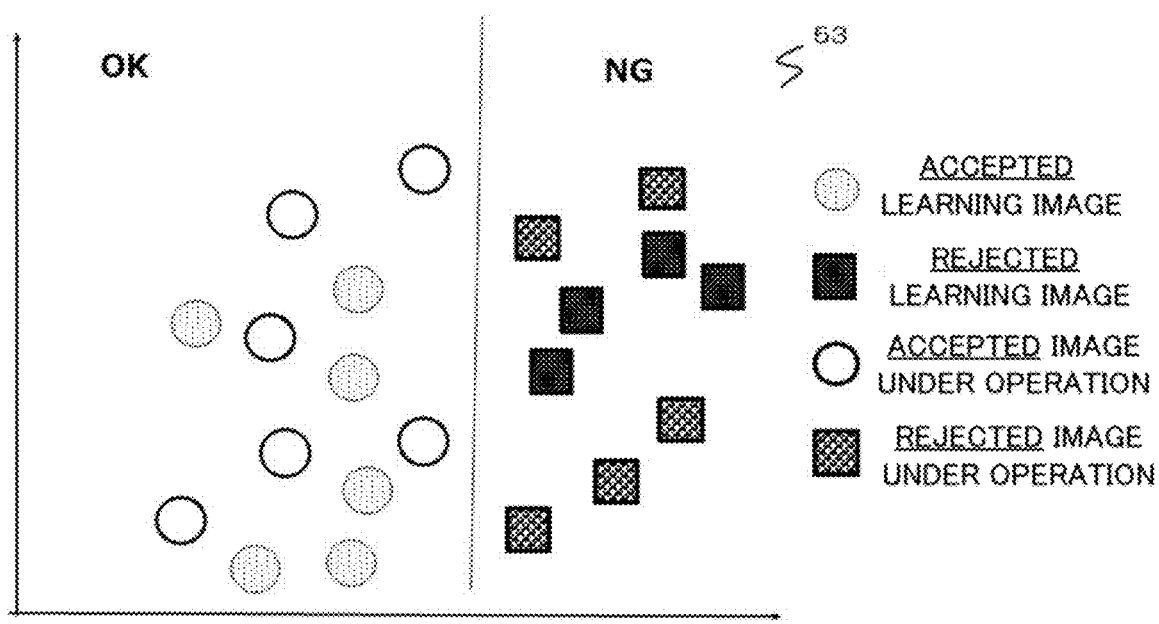
FIG. 18 is a diagram illustrating one example of an accept/reject testing through the SVM after replacement with a selected image inspection program.

Next, FIG. 16, FIG. 17, and FIG. 18 are used to describe that an image that has been misrecognized through the first image inspection program is correctly determined as to whether it is accepted or rejected by replacing the first image inspection program with the second image inspection program.

FIG. 16 is a diagram illustrating one example of an accept/reject testing through the SVM. FIG. 16 illustrates a state that the first inspection program correctly makes the accept/reject testing on learning images.

FIG. 17 is a diagram illustrating one example of an erroneous determination through the SVM when misrecognized data appear. FIG. 17 illustrates the state that the misrecognized images, which cannot be correctly determined through the first image inspection program, appear as the inspection proceeds. The 52*a* illustrates a misrecognized image (falsely reported image) where the first image inspection program determines the image as a rejected image, while the operator determines the image as an accepted image. The 52*b* illustrates a misrecognized image (misjudged image) where the first image inspection program determines the image as an accepted image, while the operator determines the image as a rejected image.

FIG. 18 is a diagram illustrating one example of an accept/reject testing through the SVM after replacement with an image inspection program that can make a correct accept/reject testing on a misrecognized image. FIG. 18 illustrates the case where when a second image inspection program exhibiting an optimum fitness with respect to a misrecognized image is used to make the accept/reject testing on inspection images, it can correctly make the accept/reject testing on the inspection images.

A hardware configuration of the selection device 400 includes the respective parts of a CPU, a main memory device, an auxiliary memory device, an input device, an output device, and a communication I/F. These respective parts are connected to each other via a bus. Description of the respective parts is the same as the descriptions of the respective parts in the learning device 100 and the inspection device 200. Therefore, the description is omitted here.

Note that, the selection device 400 may be a part of cloud that is a group of computers on the network.

A procedure for replacement with an image inspection program after selection of the image inspection program will be described in detail.

FIG. 11 is a sequence diagram illustrating one example of a flow between selection of and replacement with an image inspection program in a learning-type inspection system. Hereinafter, this will be described with reference to FIG. 1 and FIG. 10.

In the step S210, the testing part 240 of the control part 220 of the inspection device 200 obtains an optimum image inspection program (first image inspection program) stored in the image inspection program DB 160. The flow moves to S211.

In the step S211, the testing part 240 obtains an inspection image stored in the inspection image DB 270. The flow moves to the S212.

In the step S212, the testing part 240 makes an accept/reject testing on the inspection image using the first image inspection program. The flow moves to the S213.

In the step S213, the testing part 240 stores, in the testing result DB 280, inspection images and results of the accept/reject testing on the inspection images through the first image inspection program. The flow moves to the S214.

In the step S214, the testing input part 320 of the operator testing device 300 obtains the inspection images and the results of the accept/reject testing on the inspection images through the first image inspection program which are stored in the testing result DB 280. The flow moves to the S215.

In the step S215, the operator testing input part 320 receives the accept/reject testing by the operator on the inspection images that have undergone the accept/reject testing through the first image inspection program. Then, the operator testing input part 320 selects the misrecognized image based on results of the accept/reject testing through the first image inspection program and the accept/reject testing by the operator. The flow moves to the S216.

In the step S216, the operator testing input part 320 sends the inspection device 200 information on the misrecognized inspection image obtained from the accept/reject testing by the operator. The flow moves to the S217. The inspection device 200 that has received the information on the misrecognized inspection image stores the information in the misrecognition DB 290 of the memory part 230. Note that, the information on the misrecognized inspection image includes information on "misjudged image" and information on "falsely reported image". The "misjudged image" is an image that is determined as an "accepted image" through the first image inspection program but is determined as a "rejected image" by the operator. The falsely reported image is an image that is determined as a "rejected image" through the first image inspection program but is determined as an "accepted image" by the operator.

In the step S217, the notification part 260 of the inspection device 200 obtains the information on the misrecognized inspection image, which is stored in the misrecognition DB 290. The flow moves to the S218.

In the step S218, the notification part 260 determines whether the number of the misrecognized inspection images exceeds a predetermined number. When the notification part 260 determines that the number of the misrecognized inspection images exceeds the predetermined number, the flow moves to the S219. Meanwhile, when the notification part 260 determines that the number of the misrecognized inspection images does not exceed the predetermined number, the flow moves back to the S211. Then, the testing part 240 continues to inspect the inspection image.

In the step S219, the notification part 260 notifies the selection device 400 that the number of the misrecognized images exceeds the predetermined number. Then, the flow moves to the S220.

In the step S220, when the notification from the notification part 260 is received, the selection part 430 of the selection device 400 obtains an image inspection program from the group of the image inspection programs stored in the image inspection program DB 160. Then, the flow moves to the S221.

In the step S221, the selection part 430 obtains the information on the misrecognized inspection images stored in the misrecognition DB 290. Then, the flow moves to the S222.

In the step S222, the selection part 430 makes the accept/reject testing on the misrecognized inspection image through the obtained image inspection program to thereby determine fitness of the image inspection program. Then, the flow moves to the S223.

All the image inspection programs in the group of the image inspection programs stored in the image inspection program DB 160 are determined for fitness.

In the step S223, the selection part 430 selects a second image inspection program based on the fitness obtained. Then, the flow moves to the S224.

An image inspection program exhibiting an optimum fitness selected from the image inspection programs that exceed a predetermined value of the accuracy is selected as the second image inspection program. Here, a method for selecting the image inspection program exhibiting the optimum fitness is as described above.

In the step S224, the selection device 400 sends the second image inspection program selected in the selection part 430 to the inspection device 200. Then, the flow moves to the S225.

In the step S225, the replacement part 250 of the inspection device 200 replaces the first image inspection program with the second image inspection program. Then, the flow terminates.

Figure 19:
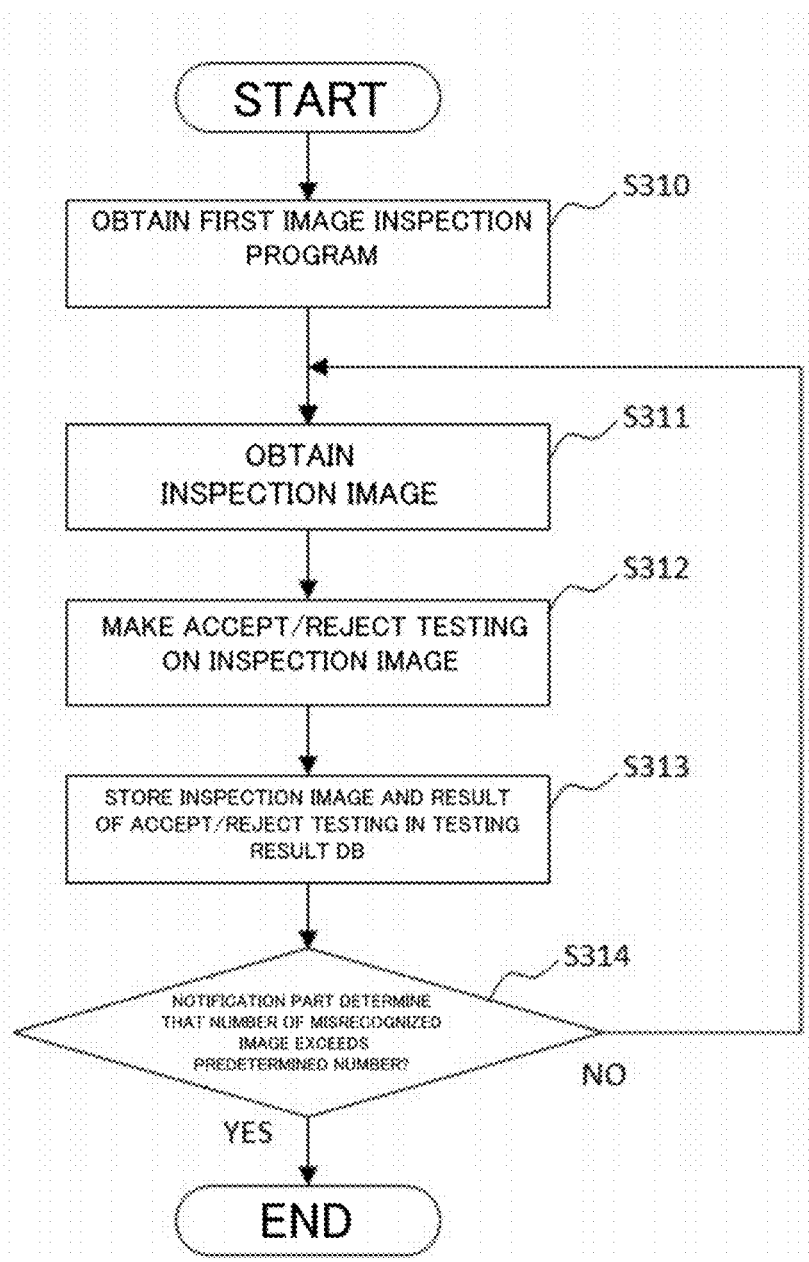
FIG. 19 is a flowchart illustrating one example of a flow where a testing part of an inspection device makes an accept/reject testing on an inspection image.

The flow where the testing part of the inspection device makes the accept/reject testing on an inspection image will be described with reference to a flowchart illustrated in FIG. 19.

In the step S310, the testing part 240 of the control part 220 of the inspection device 200 obtains an optimum image inspection program (first image inspection program) stored in the image inspection program DB 160. The flow moves to S311.

In the step S311, the testing part 240 obtains an inspection image stored in the inspection image DB 270. The flow moves to S312.

In the step S312, the testing part 240 makes the accept/reject testing on the inspection image using the first image inspection program. The flow moves to S313.

In the step S313, the testing part 240 stores, in the testing result DB 280, inspection images and results of the accept/reject testing on the inspection images through the first image inspection program. The flow moves to S314.

In the step S314, when the notification part 260 of the inspection device 200 determines that the number of the misrecognized inspection images exceeds a predetermined number, the testing part 240 terminates the procedure for making the accept/reject testing on the inspection image using the first image inspection program. Meanwhile, when the notification part 260 does not determine that the number of the misrecognized inspection images exceeds the predetermined number, the testing part 240 continues to make the accept/reject testing on the inspection image using the first image inspection program.

Figure 20:
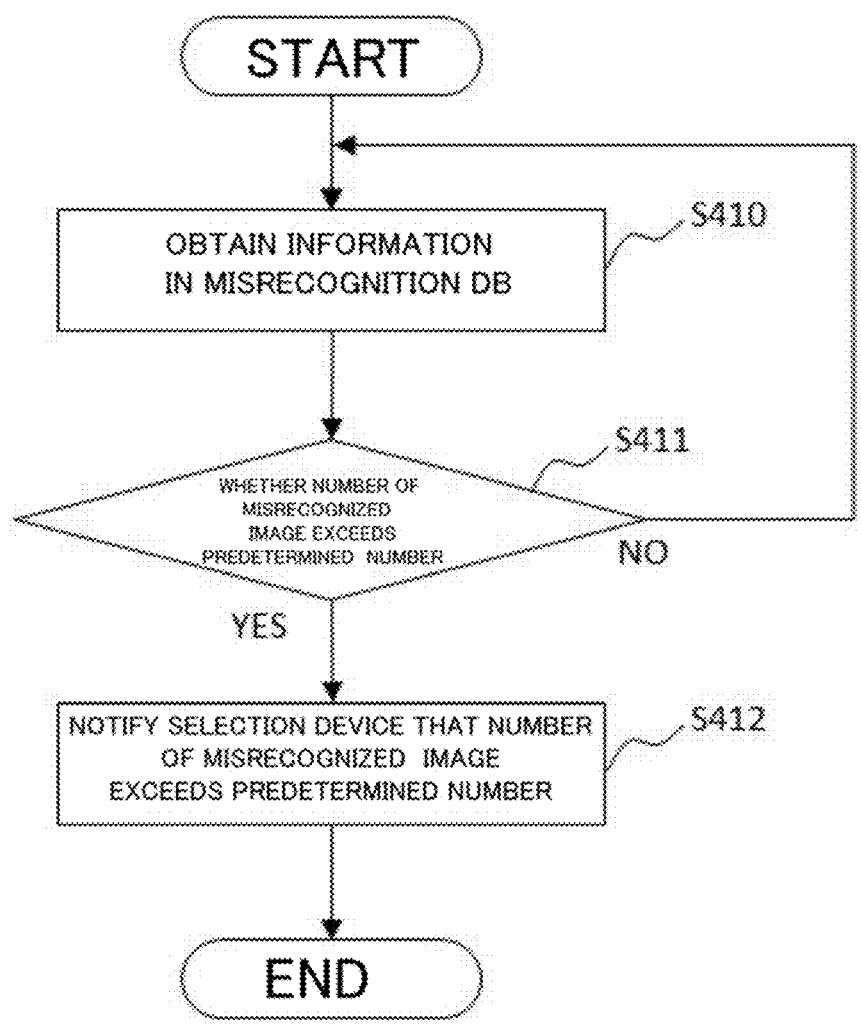
FIG. 20 is a flowchart illustrating one example of a flow where a notification part of an inspection device sends notification to a selection device based on the information obtained from a misrecognition DB.

The flow where a notification part of the inspection device sends notification to the selection device based on the information obtained from a misrecognition DB will be described with reference to a flowchart illustrated in FIG. 20.

In the step S410, the notification part 260 of the inspection device 200 obtains information on the misrecognized inspection image stored in the misrecognition DB 290. The flow moves to S411.

In the step S411, the notification part 260 determines whether the number of the misrecognized inspection images exceeds a predetermined number. When the notification part 260 determines that the number of the misrecognized inspection images exceeds the predetermined number, the flow moves to S412. Meanwhile, when the notification part 260 determines that the number of the misrecognized inspection images does not exceed the predetermined number, the flow moves back to the S410. As a result, the testing part 240 continues the inspection procedure for determining whether the inspection image is accepted or rejected.

In the step S412, the notification part 260 notifies the selection device 400 that the number of the misrecognized images exceeds the predetermined number. Then, the present flow terminates.

Figure 21:
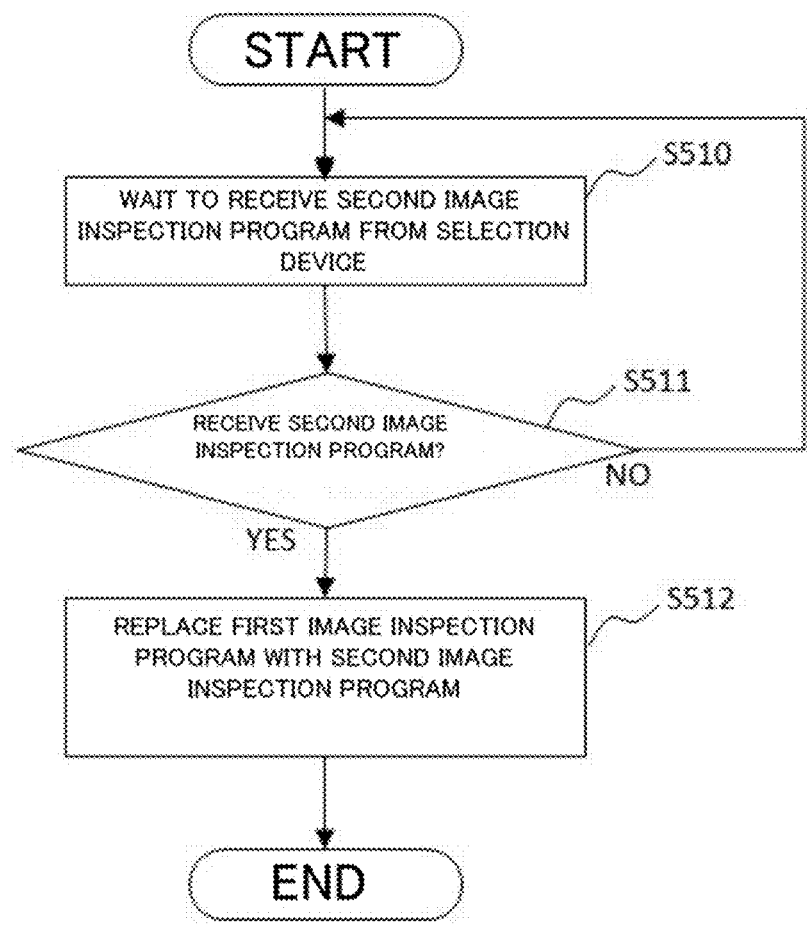
FIG. 21 is a flowchart illustrating one example of a flow where a replacement part of an inspection device replaces a first image inspection program with a second image inspection program.

The flow where a replacement part of the inspection device replaces a first image inspection program with a second image inspection program will be described with reference to a flowchart illustrated in FIG. 21.

In the step S510, the inspection device 200 waits for receipt of the second image inspection program from the selection device 400. The flow moves to S511.

In the step S511, when the inspection device 200 receives the second image inspection program from the selection device 400, the flow moves to S512. Meanwhile, when the inspection device 200 does not receive the second image inspection program from the selection device 400, the flow moves back to the S510. Then, the inspection device 200 waits for the receipt from the selection device 400.

In the step S512, the replacement part 250 of the inspection device 200 replaces the first image inspection program with the second image inspection program. Then, the present flow terminates.

Figure 22:
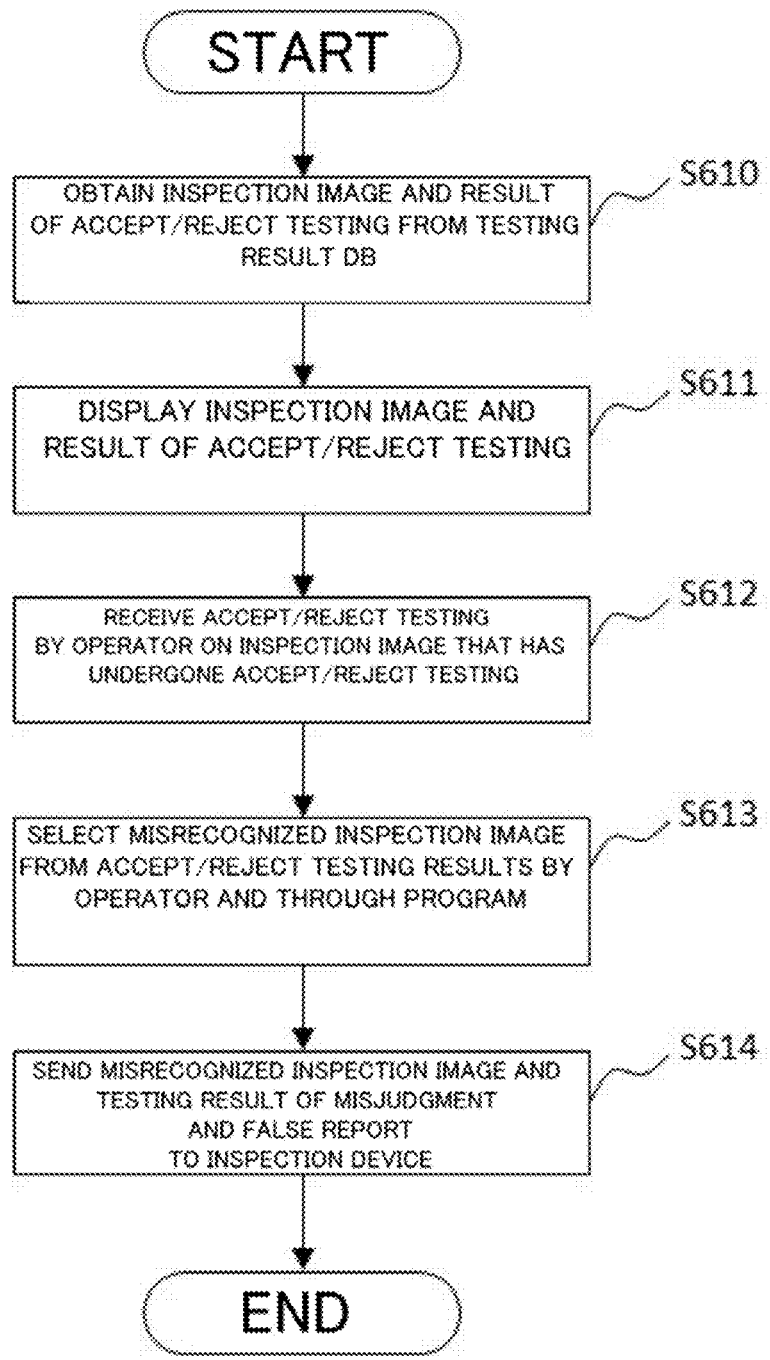
FIG. 22 is a flowchart illustrating one example of the flow for sending an inspection device information on a misrecognized inspection image, which is obtained from results of the accept/reject testing by an operator input in an operator testing device.

The flow for storing, in a misrecognition DB, information on a misrecognized inspection image, which is obtained from results of the accept/reject testing by an operator input in an operator testing device, will be described with reference to a flowchart illustrated in FIG. 22.

In a step S610, the operator testing input part 320 of the operator testing device 300 obtains inspection images and results of the accept/reject testing on the inspection images through the first image inspection program, which are stored in the testing result DB 280. Then, the flow moves to S611.

In the step S611, the operator testing input part 320 displays the inspection images and the results of the accept/reject testing on the inspection images through the first image inspection program. Then, the flow moves to S612.

In the step S612, the operator testing input part 320 receives the accept/reject testing by the operator on the inspection images that have undergone the accept/reject testing through the first image inspection program. Then, the flow moves to S613.

In the step S613, the operator testing input part 320 selects a misrecognized inspection image from results of the accept/reject testing by the operator and results of the accept/reject testing through the first image inspection program. Then, the flow moves to S614.

In the step S614, the operator testing input part 320 sends information on misrecognized inspection images obtained from the results of the accept/reject testing by the operator (including information on the misjudged image and the falsely reported image) to the inspection device 200. Then, the present flow terminates. The inspection device 200 that has received the information on the misrecognized inspection images stores the above information in the misrecognition DB 290 of the memory part 230.

Figure 23:
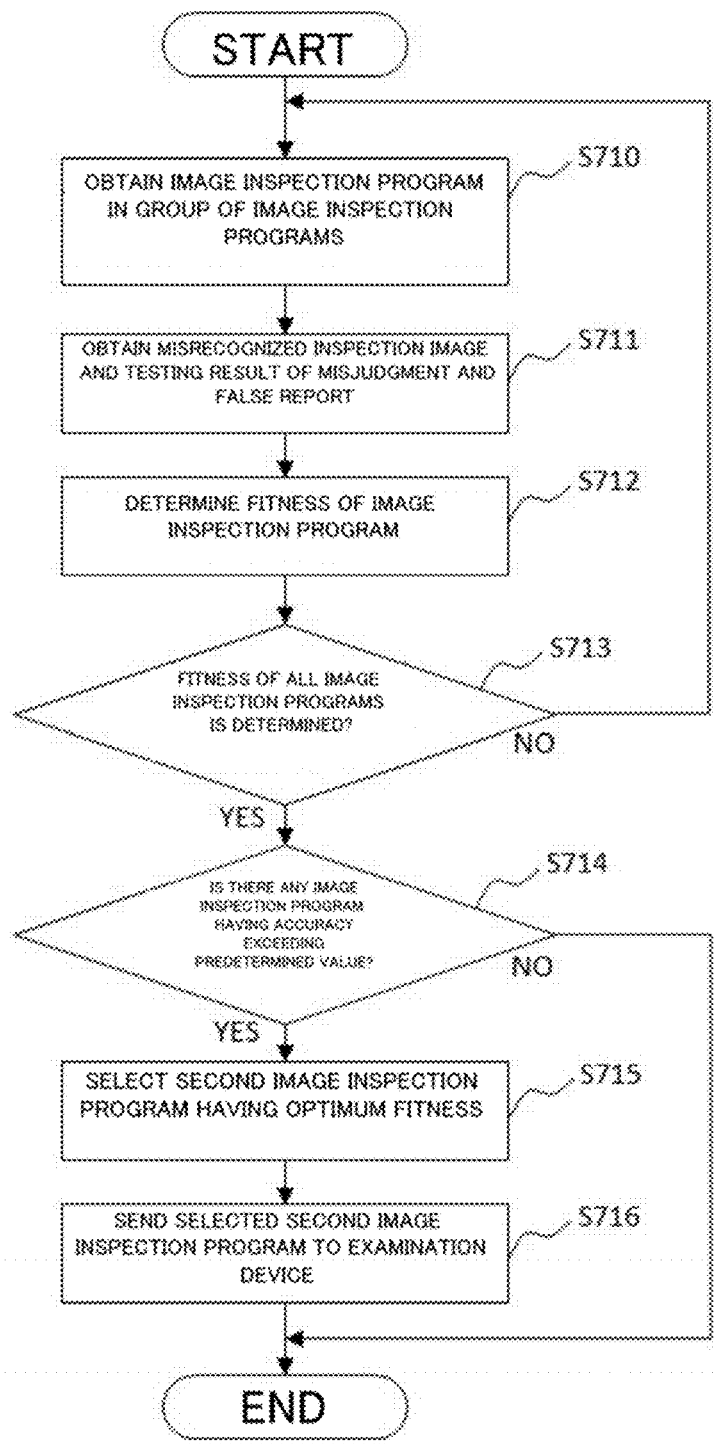
FIG. 23 is a flowchart illustrating one example of a flow where a selection part of a selection device selects a second image inspection program.

A flow where a selection part of a selection device selects a second image inspection program will be described with reference to a flowchart illustrated in FIG. 23.

In the step S710, when notification from the notification part 260 is received, the selection part 430 of the selection device 400 obtains the image inspection program from the group of the image inspection programs stored in the image inspection program DB 160. The flow moves to S711.

In the step S711, the selection part 430 obtains information on the misrecognized inspection image stored in the misrecognition DB 290. Then, the flow moves to S712. Here, the information on the misrecognized inspection images includes information on "misjudged image" and information on "falsely reported image". The "misjudged image" is an image that is determined as an "accepted image" through the first image inspection program but is determined as a "rejected image" by the operator. The "falsely reported image" is an image that is determined as a "rejected image" through the first image inspection program but is determined as an "accepted image" by the operator.

In the step S712, the selection part 430 makes the accept/reject testing on the misrecognized inspection image through the obtained image inspection program to thereby determine fitness of the image inspection program. The flow moves to S713.

In the step S713, the selection part 430 determines whether fitness of all the image inspection programs in the group of the image inspection programs, which are stored in the image inspection program DB 160, are determined. When fitness of all the image inspection programs are determined, the selection part 430 moves the flow to S714. When fitness of all the image inspection programs are not determined, the selection part 430 moves the flow back to the S710, and the flow for determining the fitness is continued.

In the step S714, the selection part 430 determines whether there is any image inspection program having an accuracy exceeding a predetermined value in the image inspection programs satisfying a predetermined fitness. When there is any image inspection program having an accuracy exceeding the predetermined value, the selection part 430 moves the flow to S715. When there is no image inspection program having an accuracy exceeding the predetermined value, the selection part 430 terminates the present flow. In the selection part 430, when the second image inspection program cannot be selected, the operator will make a new image inspection program obtained through relearning in the learning device 100.

In the step S715, the selection part 430 selects a second image inspection program exhibiting an optimum fitness from the image inspection programs satisfying the predetermined fitness and an accuracy exceeding the predetermined value. Then, the flow moves to S716. Here, a method for selecting the image inspection program exhibiting the optimum fitness is as described in the description in the step S223.

In the step S716, the selection device 400 sends the second image inspection program selected in the selection part 430 to the inspection device 200. Then, the present flow terminates.

The learning-type inspection system 500 illustrated in FIG. 1 is constituted with four devices of the learning device 100, the inspection device 200, the operator testing device 300, and the selection device 400. However, these devices may be appropriately combined to form configurations of one to two device(s) as described below.

Second Embodiment

Figure 24:
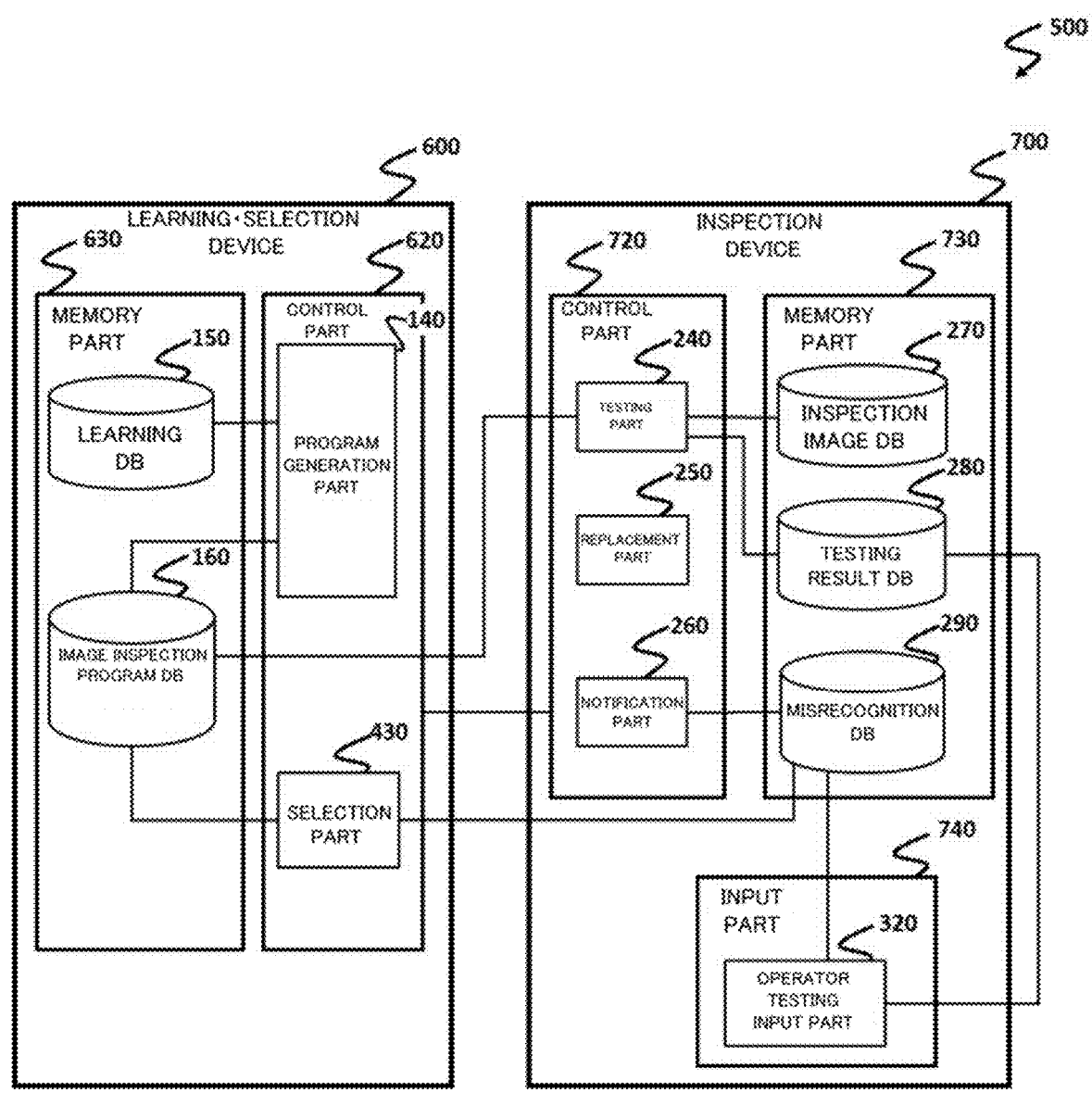
FIG. 24 is a diagram illustrating another example of a configuration of a learning-type inspection system including an inspection device.

A learning•selection device 600 in the learning-type inspection system 500 illustrated in FIG. 24 is one device obtained by combining the learning device 100 with the selection device 400 in the learning-type inspection system 500 illustrated in FIG. 1. Moreover, an inspection device 700 in the learning-type inspection system 500 illustrated in FIG. 24 is one device obtained by combining the inspection device 200 with the operator testing device 300 in the learning-type inspection system 500 illustrated in FIG. 1. Except for the above, each constitutional part illustrated in FIG. 24 has the same function as the function of each constitutional part illustrated in FIG. 1. For this reason, the same reference numerals are given to the same configurations already described, and the description thereof will be omitted.

A learning•selection device 600 includes a control part 620 and a memory part 630. The control part 620 controls the entire learning•selection device 600.

The control part 620 includes a program generation part 140 and a selection part 430. The memory part 630 includes a learning DB 150 and an image inspection program DB 160.

The inspection device 700 includes a control part 720, a memory part 730, and an input part 740. The control part 720 controls the entire inspection device 700.

The control part 720 includes a testing part 240, a replacement part 250, and a notification part 260. The memory part 730 includes an inspection image DB 270, a testing result DB 280, and a misrecognition DB 290.

The input part 740 includes an operator testing input part 320.

The operator testing device 300 illustrated in FIG. 1 may be a device independent of the inspection device 200 illustrated in FIG. 1. Alternatively, as illustrated in FIG. 24, the operator testing device 300 may be incorporated into the inspection device by adding the function of the operator testing input part 320 to the inspection device 200.

Third Embodiment

Figure 25:
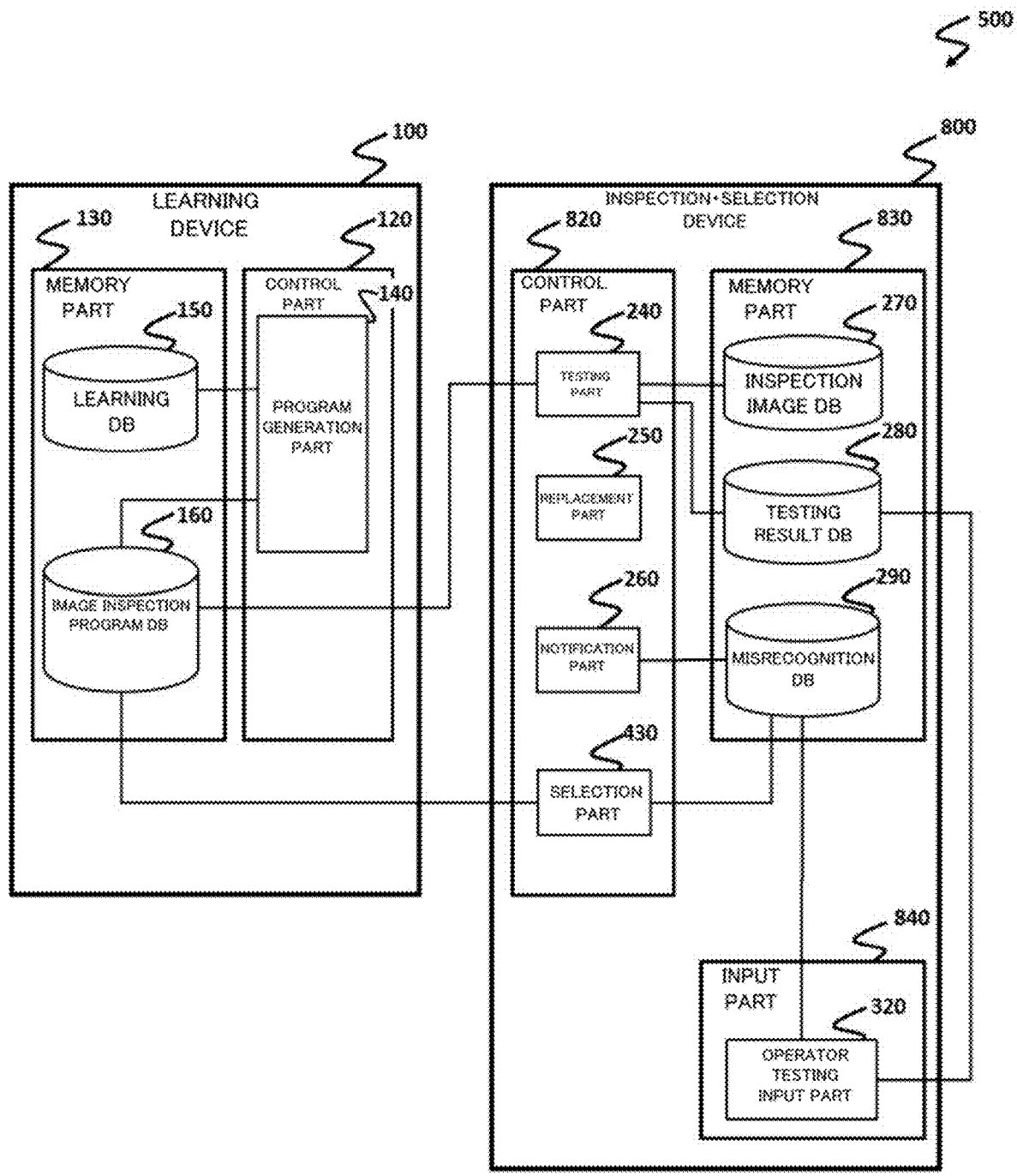
FIG. 25 is a diagram illustrating another example of a configuration of a learning-type inspection system including an inspection•selection device.

An inspection•selection device 800 in the learning-type inspection system 500 illustrated in FIG. 25 is one device obtained by combining the inspection device 200, the operator testing device 300, and the selection device 400 in the learning-type inspection system 500 illustrated in FIG. 1. Except for the above, each constitutional part illustrated in FIG. 25 has the same function as the function of each constitutional part illustrated in FIG. 1. For this reason, the same reference numerals are given to the same configurations already described, and the description thereof will be omitted.

The inspection selection device 800 includes a control part 820, a memory part 830, and an input part 840. The control part 820 controls the entire inspection selection device 800.

The control part 820 includes a testing part 240, a replacement part 250, a notification part 260, and a selection part 430. The memory part 830 includes an inspection image DB 270, a testing result DB 280, and a misrecognition DB 290.

The input part 840 includes an operator testing input part 320.

Fourth Embodiment

Figure 26:
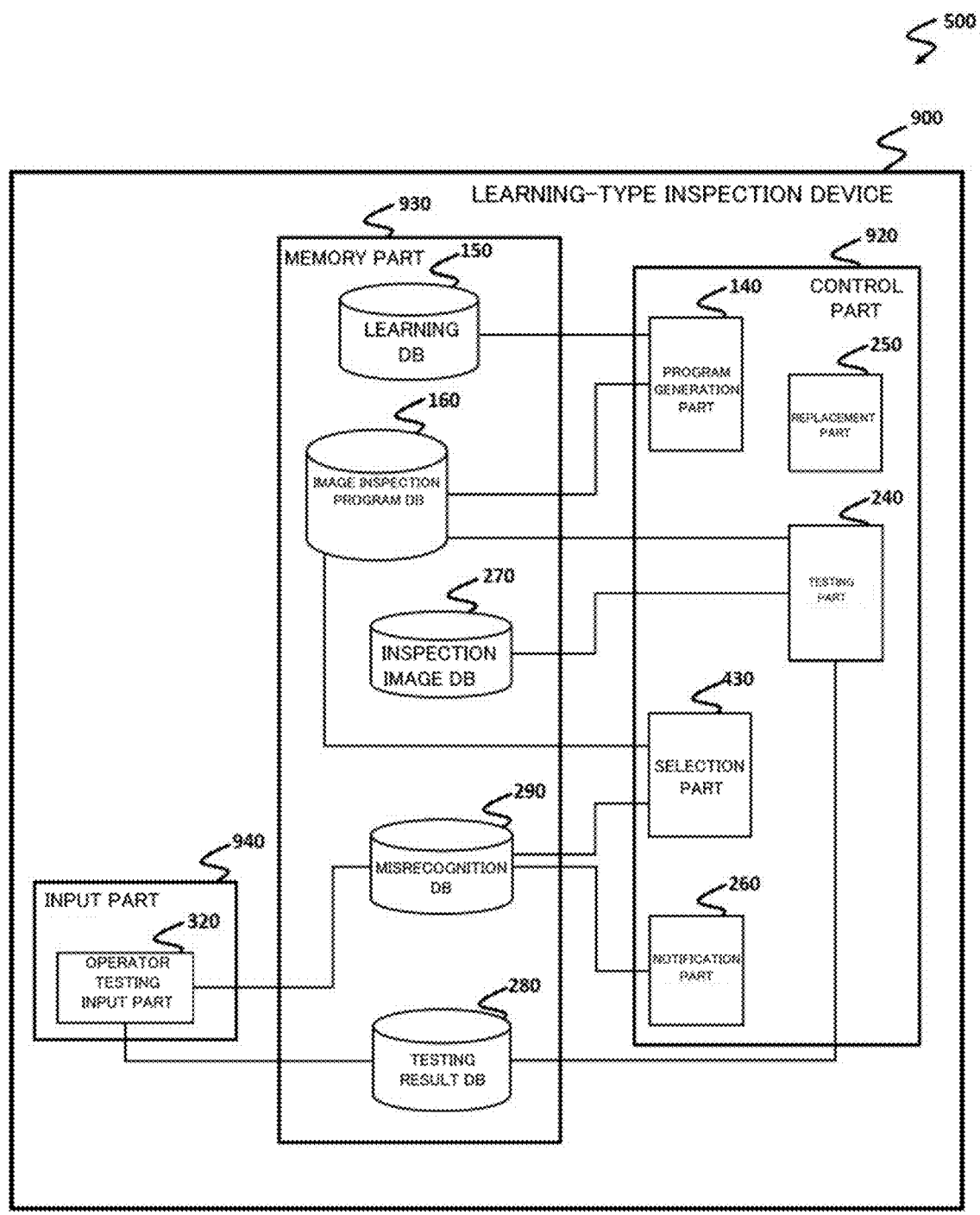
FIG. 26 is a diagram illustrating another example of a configuration of a learning-type inspection system including a learning-type inspection device.

A learning-type inspection device 900 in the learning-type inspection system 500 illustrated in FIG. 26 is one device obtained by combining the learning device 100, the inspection device 200, the operator testing device 300, and the selection device 400 in the learning-type inspection system 500 illustrated in FIG. 1. Except for the above, each constitutional part illustrated in FIG. 26 has the same function as the function of each constitutional part illustrated in FIG. 1. For this reason, the same reference numerals are given to the same configurations already described, and the description thereof will be omitted.

The learning-type inspection device 900 includes a control part 920, a memory part 930, and an input part 940. The control part 930 controls the entire learning-type inspection device 900.

The control part 920 includes a program generation part 140, a testing part 240, a replacement part 250, a notification part 260, and a selection part 430. The memory part 930 includes a learning DB 150, an image inspection program DB 160, an inspection image DB 270, a testing result DB 280, and a misrecognition DB 290.

The input part 940 includes an operator testing input part 320.

As described above, in the inspection device, when a first image inspection program is used to make the accept/reject testing on an inspection image and the misrecognized image exceeds a predetermined standard, the first image inspection program is replaced with a second image inspection program.

This makes it possible to inspect an image using a second image inspection program that can increase precision of the accept/reject testing in a shorter time than before without executing time-consuming relearning, and makes it possible to continuously operate the production lines.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superior and inferiority of the invention. Although one or more embodiments of the present invention have been described in detail, it should be understood that the various changes, substitutions, and alterations could be made hereto without departing from the spirit and scope of the invention.

What is claimed is:

1. An inspection device comprising a processor configured to execute a process, the process comprising:
   making an accept/reject testing on an inspection image through a first image inspection program in a group of image inspection programs including a plurality of learning-type image inspection programs of different generations, each of which satisfies a predetermined standard of fitness of the image inspection program with respect to a learning image;
   selecting a second image inspection program to correctly determine all misjudged images in the inspection images that have misrecognized, as a rejected image, based on a determined fitness from accuracy of the accept/reject testing of the learning-type image inspection programs and a margin size from a boundary separating acceptance and rejection: and
   replacing the first image inspection program with a-the second image inspection program in the group of image inspection programs which exhibits an optimum fitness with respect to the inspection image that has been misrecognized, when an operator makes the accept/reject testing on the inspection image that has undergone the accept/reject testing through the first image inspection program and finds the inspection image that has been misrecognized.

2. The inspection device according to claim 1, wherein the second image inspection program is selected from all the image inspection programs including the image inspection programs of past generations in the group of the image inspection programs.

3. An inspection method for making an accept/reject testing on an inspection image using an image inspection program, the inspection method comprising:
   making the accept/reject testing on the inspection image through a first image inspection program in a group of image inspection programs including a plurality of learning-type image inspection programs of different generations, each of which satisfies a predetermined standard of fitness of the image inspection program with respect to a learning image, by a processor;
   selecting a second image inspection program to correctly determine all misjudged images in the inspection images that have misrecognized, as a rejected image, based on a determined fitness from accuracy of the accept/reject testing of the learning-type image inspection programs and a margin size from a boundary separating acceptance and rejection, by the processor: and replacing the first image inspection program with a-the second image inspection program in the group of image inspection programs which exhibits an optimum fitness with respect to the inspection image that has been misrecognized, by the processor, when an operator makes the accept/reject testing on the inspection image that has undergone the accept/reject testing through the first image inspection program and finds the inspection image that has been misrecognized.

4. The inspection method according to claim 3, wherein the second image inspection program is selected from all the image inspection programs including the image inspection programs of past generations in the group of the image inspection programs, by the processor.

5. A non-transitory recording medium having stored therein an inspection program that makes an accept/reject testing on an inspection image using an image inspection program, the inspection program causing a computer to execute a process, the process comprising:

making the accept/reject testing on the inspection image through a first image inspection program in a group of image inspection programs including a plurality of learning-type image inspection programs of different generations, each of which satisfies a predetermined standard of fitness of the image inspection program with respect to a learning image;

selecting a second image inspection program to correctly determine all misjudged images in the inspection images that have misrecognized, as a rejected image, based on a determined fitness from accuracy of the accept/reject testing of the learning-type image inspection programs and a margin size from a boundary separating acceptance and rejection; and replacing the first image inspection program with a-the second image inspection program in the group of image inspection programs which exhibits an optimum fitness with respect to the inspection image that has been misrecognized, when an operator makes the accept/reject testing on the inspection image that has undergone the accept/reject testing through the first image inspection program and finds the inspection image that has been misrecognized.

6. The non-transitory recording medium having stored therein the inspection program according to claim 5, wherein the second image inspection program is selected from all the image inspection programs including the image inspection programs of past generations in the group of the image inspection programs.

* * * * *